United States Patent
Teraoka et al.

(10) Patent No.: US 12,547,392 B2
(45) Date of Patent: Feb. 10, 2026

(54) SOFTWARE UPDATE DEVICE, SOFTWARE UPDATE SYSTEM, AND SOFTWARE UPDATE METHOD

(71) Applicant: Hitachi Astemo, Ltd., Hitachinaka (JP)

(72) Inventors: Hidetoshi Teraoka, Tokyo (JP); Masashi Yano, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 188 days.

(21) Appl. No.: 18/279,249

(22) PCT Filed: Aug. 23, 2021

(86) PCT No.: PCT/JP2021/030818
§ 371 (c)(1),
(2) Date: Aug. 29, 2023

(87) PCT Pub. No.: WO2022/195915
PCT Pub. Date: Sep. 22, 2022

(65) Prior Publication Data
US 2024/0134628 A1   Apr. 25, 2024
US 2024/0231798 A9   Jul. 11, 2024

(30) Foreign Application Priority Data
Mar. 19, 2021 (JP) .................. 2021-045987

(51) Int. Cl.
G06F 8/65 (2018.01)
(52) U.S. Cl.
CPC ..................... G06F 8/65 (2013.01)
(58) Field of Classification Search
CPC ..................... G06F 8/61; G06F 8/65
See application file for complete search history.

(56) References Cited

U.S. PATENT DOCUMENTS

| 2018/0107507 A1 | 4/2018 | Lin et al. |
| 2019/0354363 A1 | 11/2019 | Nakaguma et al. |
| 2023/0025735 A1* | 1/2023 | Acharya ............ H04L 67/12 |

FOREIGN PATENT DOCUMENTS

| JP | 11-328138 A | 11/1999 |
| JP | 2018-106461 A | 7/2018 |

OTHER PUBLICATIONS

International Search Report (PCT/ISA/210) issued in PCT Application No. PCT/JP2021/030818 dated Nov. 22, 2021 with English translation (4 pages).

(Continued)

Primary Examiner — Duy Khoung T Nguyen
(74) Attorney, Agent, or Firm — Crowell & Moring LLP

(57) ABSTRACT

A software update device (gateway) 10 includes a first update control unit 140 that performs software update for a first software unit (for example, an ECU_A 13 and an ECU_B 16) and a second update control unit 150 that performs software update for a second software unit (for example, an ECU_C 17 and an ECU_D 19). Also, the first update control unit 140 includes a first sequence control unit 141 that transmits a control command directed to a first platform, and the second update control unit 150 includes a pseudo update execution unit 151 that simulates the second software unit as a software unit on the first platform and performs the software update for the second software unit on the basis of reception of a control command for the second software unit simulated on the first platform.

8 Claims, 23 Drawing Sheets

(56) References Cited

OTHER PUBLICATIONS

Japanese-language Written Opinion (PCT/ISA/237) issued in PCT Application No. PCT/JP2021/030818 dated Nov. 22, 2021 with English translation (5 pages).

\* cited by examiner

| IDENTIFICATION ID ON FIRST PF (211) | ECU IDENTIFICATION INFORMATION (212) | PF IDENTIFICATION INFORMATION (213) |
|---|---|---|
| 2 | ENGINE CONTROL ECU | SECOND PF |
| 3 | METER CONTROL ECU | THIRD PF |
|  | .... |  |

| FIRST PF CONTROL COMMAND | PF TYPE | INTERFACE AFTER CONVERSION |
|---|---|---|
| SW INFORMATION ACQUISITION REQUEST | SECOND PF | SECOND COMMUNICATION UNIT VERSION READING REQUEST (UDS SID 22) |
| | THIRD PF | THIRD COMMUNICATION UNIT GetECUVersion |
| DATA TRANSFER START REQUEST | SECOND PF | NON (OK RESPONSE) |
| | THIRD PF | NON (OK RESPONSE) |
| DATA TRANSFER REQUEST | SECOND PF | NON (OK RESPONSE) |
| | THIRD PF | THIRD COMMUNICATION UNIT RequestDownload |
| DATA TRANSFER END | SECOND PF | NON (OK RESPONSE) |
| | THIRD PF | NON (OK RESPONSE) |
| PACKAGE PROCESSING REQUEST | SECOND PF | SECOND COMMUNICATION UNIT<br>[IN CASE OF ECU THAT ALLOWS REWRITING DURING TRAVELING] DATA TRANSFER REQUEST (UDS SID 34,36,37)<br>[IN CASE OF ECU THAT DOES NOT ALLOW REWRITING DURING TRAVELING] NONE (OK RESPONSE) |
| | THIRD PF | NON (OK RESPONSE) |
| ACTIVATE REQUEST | SECOND PF | SECOND COMMUNICATION UNIT<br>[IN CASE OF ECU THAT ALLOWS REWRITING DURING TRAVELING] ACTIVATION REQUEST (UDS SID 31)<br>[IN CASE OF ECU THAT DOES NOT ALLOW REWRITING DURING TRAVELING] DATA TRANSFER REQUEST (UDS SID 34,36,37) |
| | THIRD PF | THIRD COMMUNICATION UNIT Activate |
| | ... | |

221　222　223

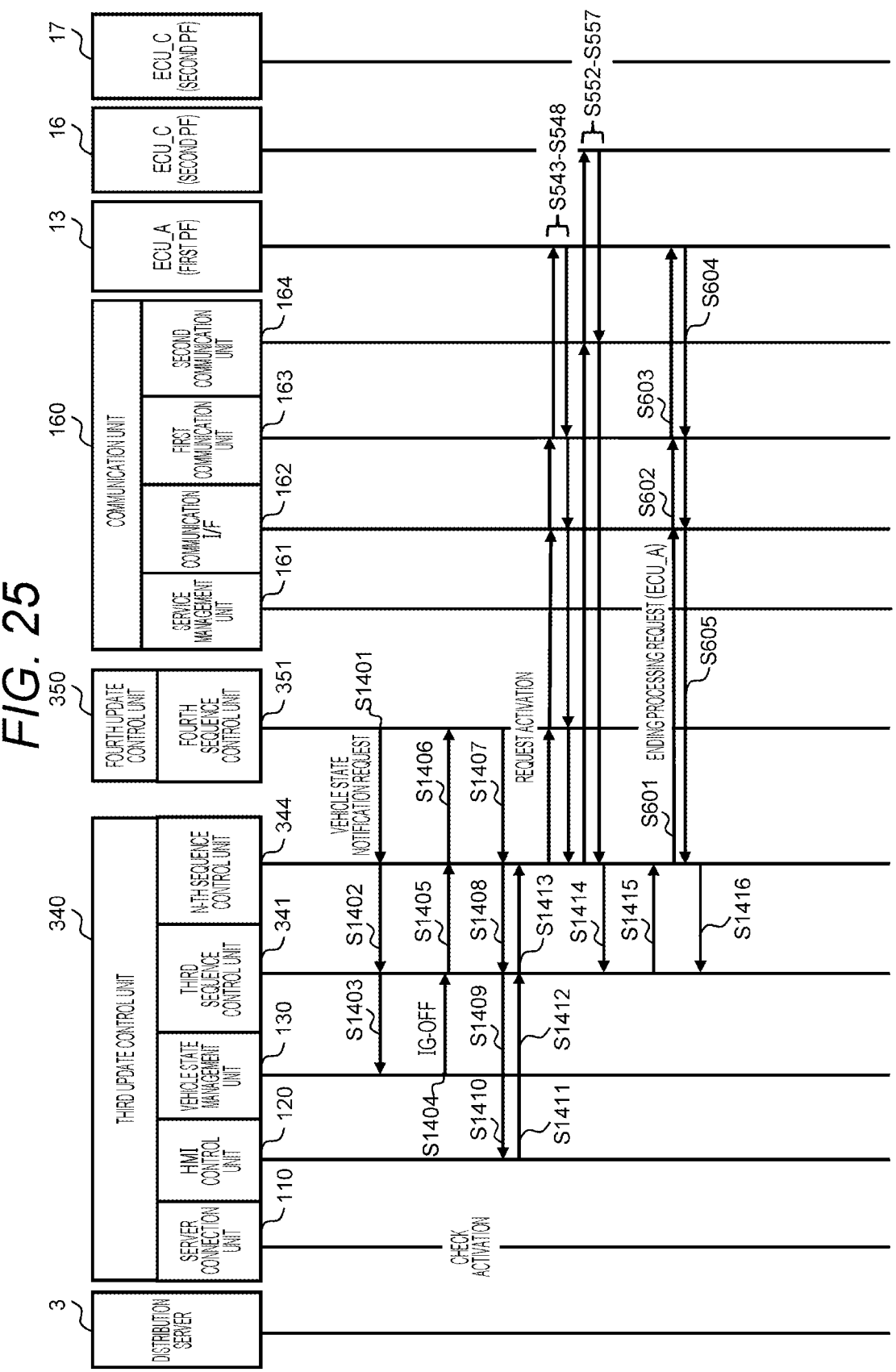

SOFTWARE UPDATE DEVICE, SOFTWARE UPDATE SYSTEM, AND SOFTWARE UPDATE METHOD

TECHNICAL FIELD

The present invention relates to a software update device, a software update system, and a software update method and is suitably applied to a software update device, a software update system and a software update method in which software update for a software unit (ECU) is performed by an update program distributed from a distribution server.

BACKGROUND ART

In recent years, electric (E)/electronic (E) architecture of vehicles has changed from a distributed type to a centralized type, and there has been a trend that hardware and software are independently developed. In development of software, for example, standardization of automobile software update technologies (specifically, definition and the like of a master function for controlling software update, for example) by an AUTomotive Open System Architecture (AUTOSAR) Adaptive platform has been promoted. Also, since architecture configuring a software unit (electronic control unit: ECU) of an automobile is not only AUTOSAR, it is expected that there will be transition to a vehicle system in which various platforms (PFs) are present together.

For example, PTL 1 discloses a software update system that executes software update when a software update device connected to one or more other software update devices and a server via a network determines that all conditions described as an update trigger have been satisfied in a vehicle system configured of a plurality of platforms.

CITATION LIST

Patent Literature

PTL 1: JP 2018-106461 A

SUMMARY OF INVENTION

Technical Problem

However, the software update system disclosed in PTL 1 is adapted such that each software update device independently updates software in one platform and arbitration between software update devices is finally performed by an update trigger and thus has a problem that it is difficult to address the plurality of platforms with one software unit. Additionally, since it is necessary to add a control unit for controlling software update every time the numbers of platforms and the update methods increase, and complicated arbitration is assumed, there is a problem in terms of scalability.

The present invention was made in consideration of the above points and is intended to propose a software update device, a software update system, and a software update method capable of flexibly updating software of a vehicle system configured of a plurality of platforms.

Solution to Problem

In order to solve such a problem, the present invention provides a software update device that is connected to a plurality of software units including a first software unit configured of a first platform and a second software unit configured of a second platform that is different from the first platform, the software update device including: a first update control unit that performs software update for the first software unit; and a second update control unit that performs software update for the second software unit, in which the first update control unit includes a first sequence control unit that transmits a control command directed to the first platform, and the second update control unit includes a pseudo update execution unit that simulates the second software unit as a software unit on the first platform and controls the software update for the second software unit on the basis of reception of the control command for the second software unit simulated on the first platform.

Also, in order to solve such a problem, the present invention provides a software update system in which a distribution server that distributes an update program and a vehicle system are connected via a network, the vehicle system including a plurality of software units that include a first software unit configured of a first platform and a second software unit configured of a second platform that is different from the first platform, and a software update device that is connected to the first software unit and the second software unit, the software update device including a first update control unit that performs software update for the first software unit, and a second update control unit that performs software update for the second software unit, the first update control unit including a first sequence control unit that transmits a control command directed to the first platform, and the second update control unit including a pseudo update execution unit that simulates the second software unit as a software unit on the first platform and controls the software update for the second software unit on the basis of reception of the control command for the second software unit simulated on the first platform.

Also, in order to solve such a problem, the present invention provides a software update method performed by a software update device that is connected to a plurality of software units that include a first software unit configured of a first platform and a second software unit configured of a second platform that is different from the first platform, the software update device including a first update control unit that transmits a control command directed to the first platform and performs software update for the first software unit, and a second update control unit that simulates the second software unit as a software unit on the first platform and performs software update for the second software unit, and the method including: a first step of transmitting the control command for the second software unit simulated on the first platform, by the first update control unit; and a second step of converting the control command into a control command for the second platform and controlling the software update for the second software unit in accordance with the control command after the conversion, by the second update control unit that has received the control command.

Advantageous Effects of Invention

According to the present invention, it is possible to flexibly update software of a vehicle system configured of a plurality of platforms.

BRIEF DESCRIPTION OF DRAWINGS

FIG. 8 is an example of a pseudo ECU correspondence management table.

FIG. 9 is an example of an interface conversion table.

FIG. 11 is a diagram

FIG. 25 is a sequence diagram illustrating a procedure example for activation of the software package for updating the ECU according to the second embodiment.

DESCRIPTION OF EMBODIMENTS

Hereinafter, embodiments of the present invention will be described in detail with reference to drawings.

(1) First Embodiment (1-1) Configuration

Figure 1:
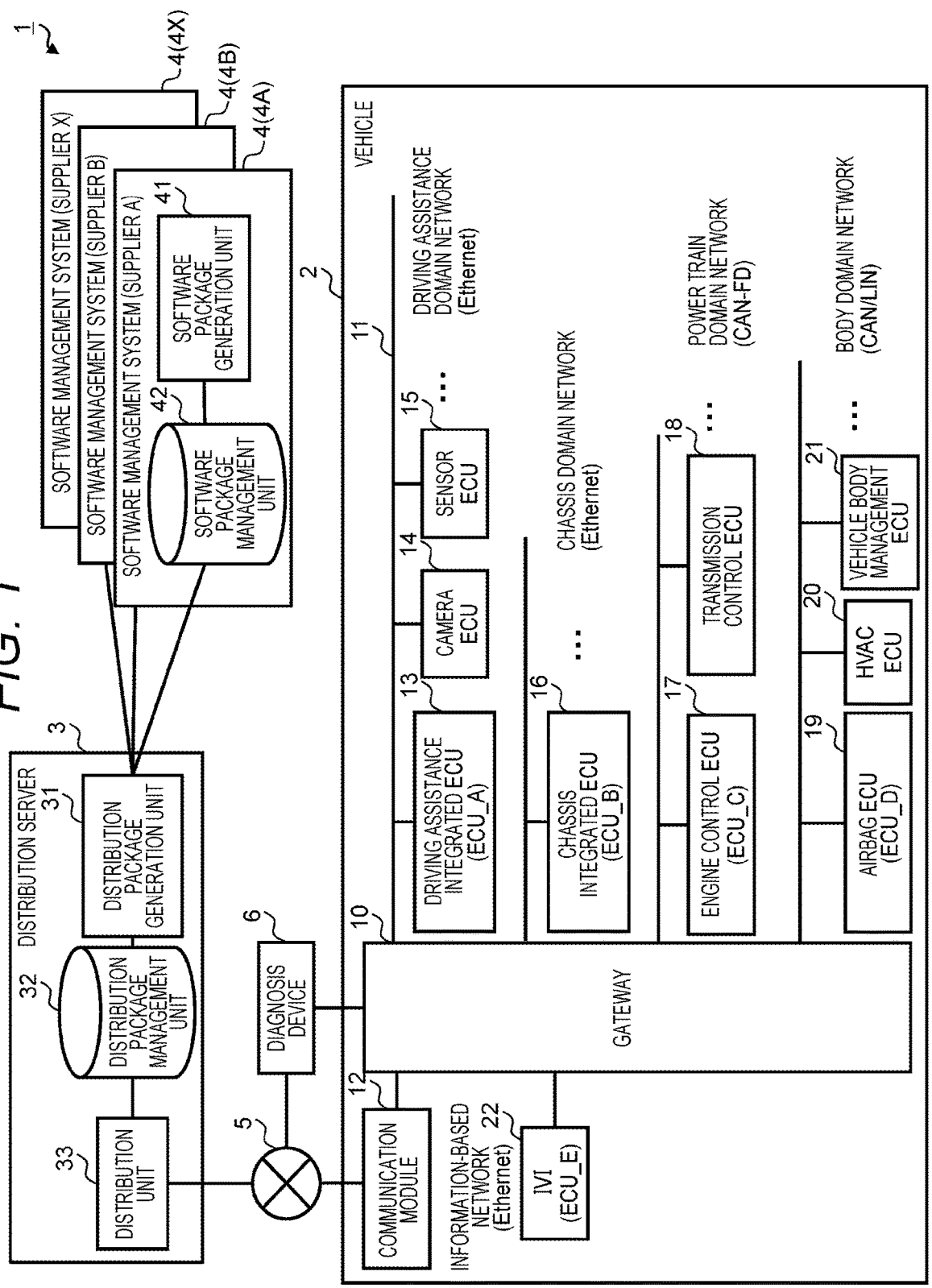
FIG. 1 is a block diagram illustrating an overall configuration example of a software update system 1 using a software update device (gateway) 10 according to a first embodiment of the present invention.

FIG. 1 is a block diagram illustrating an overall configuration example of a software update system 1 using a software update device (gateway) 10 according to a first embodiment of the present invention.

As illustrated in FIG. 1, the software update system 1 is configured by a vehicle 2 and a distribution server 3 being communicatively connected via a wireless network 5. Also, the software update system 1 may include a diagnosis device 6 that plays a role as a tool for performing breakdown diagnosis and software update on the vehicle 2.

The distribution server 3 is a system that generates, manages, and distributes a package (distribution package) to be distributed to the vehicle 2 on the basis of a software package developed in-house by an OEM or collected from a supplier, and is an On The Air (OTA) server, for example. The distribution server 3 is configured to include a distribution package generation unit 31 that generates a distribution package on the basis of the collected software package, a distribution package management unit 32 that manages the software package and the distribution package generated by the distribution package generation unit 31, and a distribution unit 33 that distributes the software package and the distribution package to the vehicle 2 via the network 5. Note that FIG. 12, which will be described later, illustrates a data configuration example for the distribution package generated, managed, and distributed by the distribution server 3.

Note that FIG. 1 illustrates software management systems 4 (individually, 4A, 4B, and 4X) owned by suppliers as examples of software package supply sources for the distribution server 3. For example, the software management system 4A is a system owned by a supplier A and is configured to include a software package generation unit 41 that generates a software package and a software package management unit 42 that manages the software package generated by the software package generation unit 41. Note that FIGS. 10 and 11, which will be described later, illustrate a configuration example of the software package generated and managed by the software management system 4. Also, although a mode in which a software package and a distribution package are separately distributed (downloaded) from the distribution server 3 to the vehicle 2 will be described below as an example, the present embodiment is not limited thereto, and a mode in which the software package and the distribution package are integrated and distributed as one archive, for example, may be employed.

Next, a configuration of the vehicle 2 will be described. The software update system 1 illustrated in FIG. 1 has, in the vehicle 2, a configuration in which a plurality of types of platforms (PFs) are present together in one vehicle 2, and the software update device 10 according to the present embodiment serves as a gateway and performs relay and the like of communication data between ECUs by these plurality of types of platforms.

The present embodiment will be described by referring to an AUTOSAR Adaptive Platform (AUTOSAR AP) as a first platform (first PF), an AUTOSAR Classic Platform (AUTOSAR CP) as a second platform (second PF), and another platform (for example, AUTOMOTIVE Grade Linux (AGL) (registered trademark)) as a third platform (third PF), as examples of the plurality of types of platforms that are present together in the vehicle 2.

As illustrated in FIG. 1, the vehicle 2 includes the software update device (gateway) 10, a communication module 12, a drive assistance integrated ECU 13, a camera ECU 14, a sensor ECU 15, a chassis integrated ECU 16, an engine control ECU 17, a transmission control ECU 18, an airbag ECU 19, an HVACECU 20, a vehicle body management ECU 21, and an IVI 22, and is configured by these being connected via an in-vehicle network 11. Among the above ECUs, each ECU illustrated on the right side of the gateway 10 in FIG. 1 corresponds to an ECU as subordinates of the gateway 10. Note that the integrated ECU is an ECU that operates by integrating a plurality of predetermined functions.

The in-vehicle network 11 employs a known communication standard, for example, any of Control AreaNetwork (CAN (registered trademark)), CAN with Flexible Data Rate (CAN-FD), a Local Interconnect Network (LIN), FlexRay, or the Ethernet (registered trademark). Although CAN or the like is employed as an in-vehicle network A, and the Ethernet is employed as an in-vehicle network B in this example, the same communication standard may be employed for the in-vehicle networks A and B. Although not illustrated in FIG. 1, each component in the vehicle 2, such as various ECUs, is connected to a storage battery with a power line and receives power supply.

The gateway 10 has function of relaying communication data between subordinate ECUs, software update for the subordinate ECUs, and checking of integrity of software mounted on the subordinate ECUs. The gateway 10 is configured on a legacy platform such as AUTOSAR CP (second PF). Note that an internal configuration of the gateway 10 will be described in detail in FIGS. 2 and 6.

A communication module 12 is a software module having a function of relaying communication between the gateway 10, the subordinate ECUs, and the IVI 22 and the distribution server 3.

The drive assistance integrated ECU 13, the camera ECU 14, and the sensor ECU 15 are ECUs that operate in relation to drive assistance of the vehicle 2 and are connected to a drive assistance domain network (the Ethernet, for example). Among these, the drive assistance integrated ECU 13 is an ECU that integrally controls a drive assistance function (Advanced Driver-Assistance Systems; ADAS) of the vehicle 2. In the following description, the drive assistance integrated ECU may be referred to as an "ECU_A" for simplicity. The camera ECU 14 is an ECU that controls a camera mounted in the vehicle 2, and the sensor ECU is an ECU that controls a sensor mounted in the vehicle 2.

The chassis integrated control ECU 16 is an ECU that integrally controls chassis-system functions (braking, steering, and the like) in the vehicle 2 and is connected to a chassis domain network (the Ethernet, for example). In the following description, the chassis integrated control ECU may be referred to as an "ECU_B" for simplicity.

The engine control ECU 17 and the transmission control ECU 18 are ECUs that control operations of drive systems of the vehicle 2 and are connected to a power train domain network (CAN-FD, for example). Among these, the engine control ECU 17 is an ECU that controls an engine, and the transmission control ECU 18 is an ECU that controls a transmission. In the following description, the engine control ECU may be referred to as an "ECU_C" for simplicity.

The airbag ECU 19, the HVACECU 20, and the vehicle body management ECU 21 are ECUs that manage various kinds of equipment and a state of the vehicle 2 and are connected to a body domain network (CAN/LIN, for example). Among these, the airbag ECU 19 is an ECU that controls an airbag, the HVACECU 20 is an ECU that controls an air conditioning system (Heating, Ventilation, and Air Conditioning; HVAC), and the vehicle body management ECU 21 is an ECU that manages a state of the vehicle body. In the following description, the airbag ECU may be referred to as an "ECU_D" for simplicity.

The IVI 22 is an ECU of In-Vehicle Infotainment (IVI) that provides information to a user who is an occupant of the vehicle 2 and receives an input from the user and is connected to an information-system network (the Ethernet, for example). In the following description, the IVI may be referred to as an "ECU_E" for simplicity.

As described above, various ECUs are mounted on the vehicle 2, and there are also a variety of types of platforms configuring these ECUs. Specifically, the drive assistance integrated ECU (ECU_A) 13 and the chassis control ECU (ECU_B) 16 are configured on the first PF, the engine control ECU (ECU_C) 17 and the airbag ECU (ECU_D) 19 are configured on the second PF, and the IVI (ECU_E) 22 is configured on the third PF. In addition, these ECUs may have different specifications in regard to whether or not software is rewritable during traveling of the vehicle 2 as well. For example, the ECU_A 13, the ECU_B 16, the ECU_C 17, and the ECU_E 22 are rewritable during traveling, while the ECU_D 18 is not rewritable during traveling.

Figure 2:
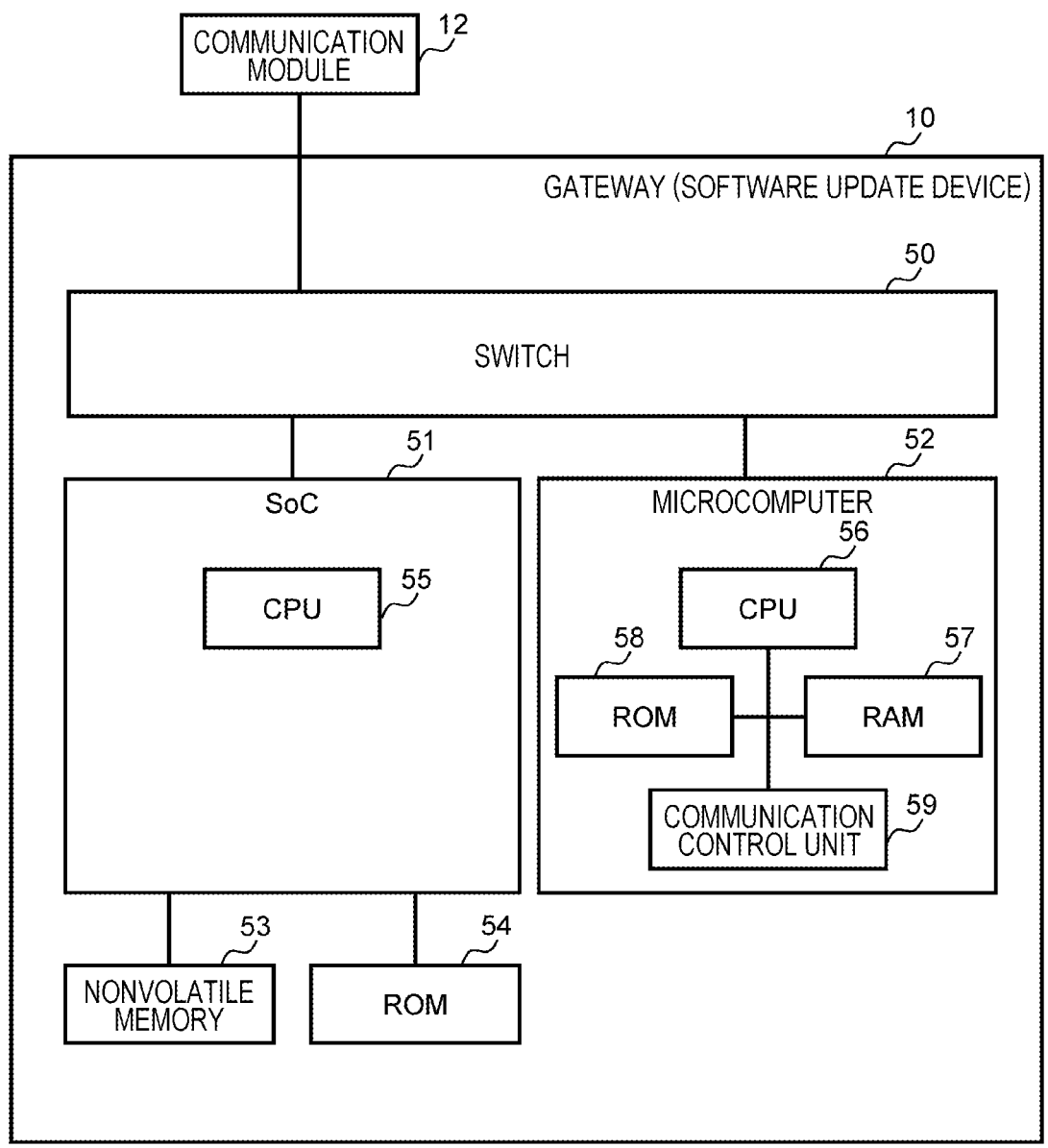
FIG. 2 is a block diagram illustrating a hardware configuration example of the gateway 10.

FIG. 2 is a block diagram illustrating a hardware configuration example of the gateway 10. As illustrated in FIG. 2, the gateway (software update device) 10 includes a switch 50, an SoC 51, a microcomputer 52, a nonvolatile memory 53, and a read only memory (ROM) 54. The switch 50 is, for example, an Ethernet switch. The SoC 51 is a System on a Chip (SoC) with high-load processing and the like mounted thereon and includes a central processing unit (CPU) 55 therein. The microcomputer 52 is a microcomputer with functions related to safety and the like mounted thereon and includes a CPU 56, a random access memory (RAM) 57, a ROM 58, and a communication control unit 59 therein.

Figure 3:
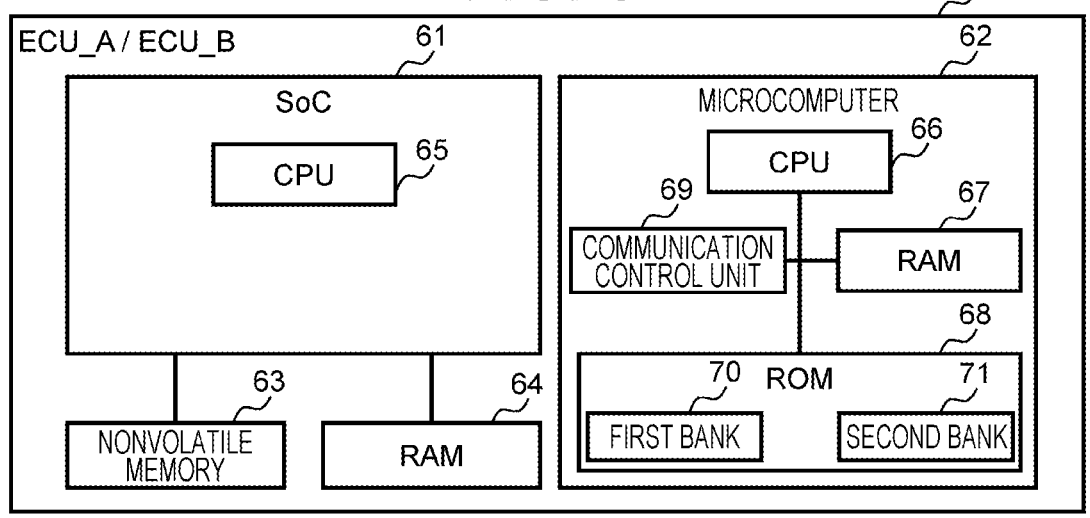
FIG. 3 is a block diagram illustrating hardware configuration examples of an ECU_A 13 and an ECU_B 16.

FIG. 3 is a block diagram illustrating hardware configuration examples of the ECU_A 13 and the ECU_B 16. As illustrated in FIG. 3, the ECU_A 13 and the ECU_B 16 include an SoC 61, a microcomputer 62, a nonvolatile memory 63, and a RAM 64. Additionally, the SoC 61 includes a CPU 65, and the microcomputer 62 includes a CPU 66, a RAM 67, a ROM 68, and a communication control unit 69. The ECU_A 13 and the ECU_B 16 are configured to be able to mount a plurality of functions as integrated ECUs by including SoCs and microcomputers, each of which includes a processor (CPU), similarly to the gateway 10 illustrated in FIG. 2. In a case of the drive assistance integrated ECU (ECU_A) 13, for example, a recognition function is mounted on the SoC 61, and a control function is mounted on the microcomputer 62. Also, the ECU_A 13 and the ECU_B 16 is configured such that software stored in the ROM 68 is rewritable even during traveling of the vehicle 2 since the ROM 68 has two banks (first bank 70, second bank 71).

Figure 4:
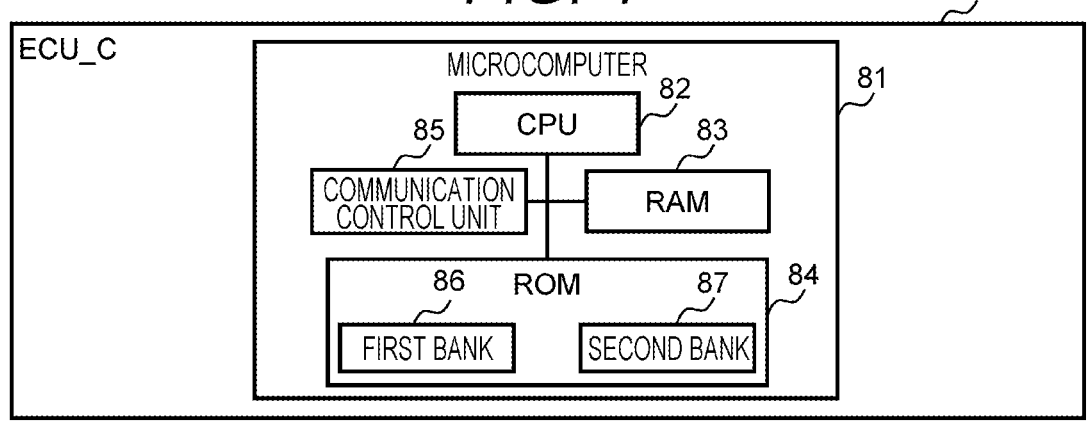
FIG. 4 is a block diagram illustrating a hardware configuration example of an ECU_C 17.

FIG. 4 is a block diagram illustrating a hardware configuration example of the ECU_C 17. As illustrated in FIG. 4, the ECU_C 17 includes one microcomputer 81. Also, the microcomputer 81 includes a CPU 82, a RAM 83, a ROM 84, and a communication control unit 85 therein similarly to the microcomputer 62 illustrated in FIG. 3. The ROM 84 of the microcomputer 81 has two banks (first bank 86, second bank 87) similarly to the ROM 68 in FIG. 3 and is thus configured to be able to rewrite the software stored in the ROM 84 even during traveling of the vehicle 2.

Figure 5:
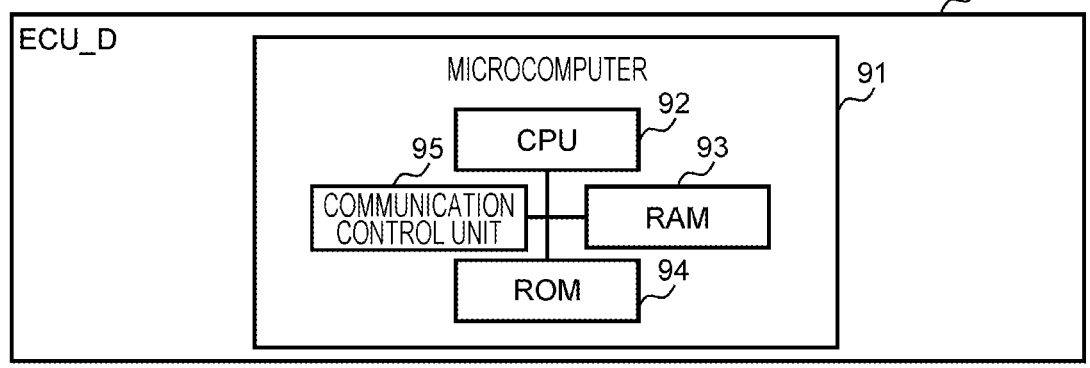
FIG. 5 is a block diagram illustrating a hardware configuration example of an ECU_D 18.

FIG. 5 is a block diagram illustrating a hardware configuration example of the ECU_D 18. As illustrated in FIG. 5, the ECU_D 18 includes one microcomputer 91 similarly to the ECU_17 illustrated in FIG. 4, and the microcomputer 91 includes a CPU 92, a RAM 93, a ROM 94, and a communication control unit 95 therein. However, the ECU_D 18 is different from the ECU_17 illustrated in FIG. 4 in that the ROM 94 of the microcomputer 91 has one bank and it is thus not possible to rewrite the software stored in the ROM 94 during traveling of the vehicle 2.

Figure 6:
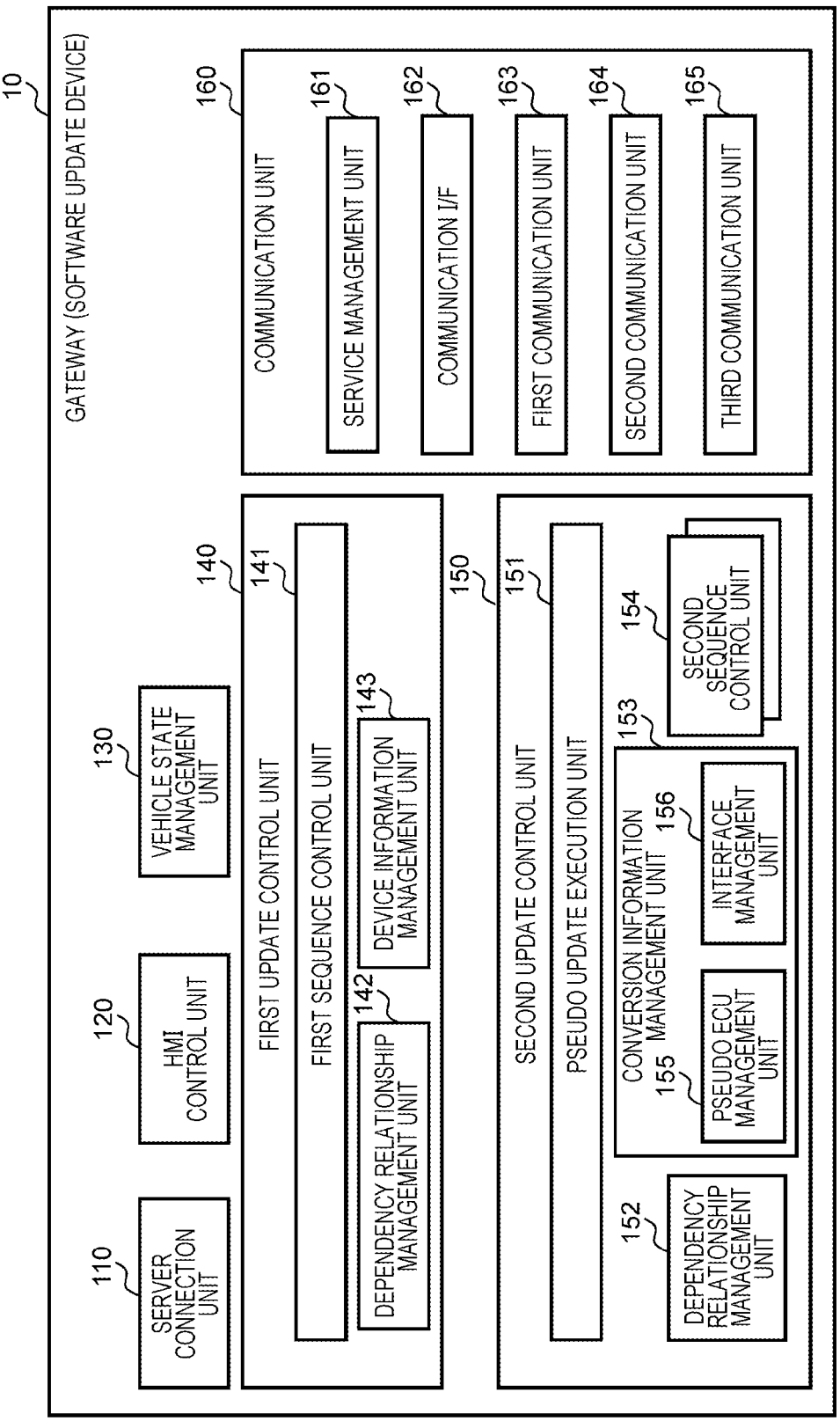
FIG. 6 is a block diagram illustrating a functional configuration example of the gateway 10.

FIG. 6 is a block diagram illustrating a functional configuration example of the gateway 10. As illustrated in FIG. 6, the gateway (software update device) 10 is configured to include a server connection unit 110, an HMI control unit 120, a vehicle state management unit 130, a first update control unit 140, a second update control unit 150, and a communication unit 160.

The server connection unit 110 is in charge of connection from the vehicle 2 to the distribution server 3 via the communication module 12. Specifically, the server connection unit 110 performs uploading of configuration information of the software and the hardware mounted in the vehicle 2 and downloading of campaign information and a distribution package to and from the distribution server 3, for example.

The HMI control unit 120 controls HMI functions (the IVI and a meter, for example) in the vehicle 2 via communication and performs display (display of update content and results, for example) necessary for software update and acquisition of an operation result (acceptance and cancellation, for example) from the user.

The vehicle state management unit 130 acquires various states (for example, a turn-on state of an ignition, a travelling state such as during traveling/during parking, and the like) of the vehicle 2 from other ECUs and the like and manages them.

The first update control unit 140 performs software update control of the ECUs on the assumption of the first PF. The first update control unit 140 is configured of a first sequence control unit 141, a dependency relationship management unit 142, and a device information management unit 143.

The first sequence control unit 141 controls a sequence of the software update in the first PF. The first sequence control unit 141 performs overall control of the ECUs that are present in the system of the vehicle 2 not only by dealing with the ECUs on the first PF that can be directly control but also by dealing with ECUs on platforms other than the first PF as ECUs on the first PF in a pseudo way. The dependency relationship management unit 142 checks a dependency relationship in the software by using dependency relationship information in the format defined for the first PF. The device information management unit 143 collects software information in the vehicle 2 and manages configuration information of the vehicle 2.

The second update control unit 150 performs software update control for the ECUs in the platforms (second PF, third PF) other than the first PF. The second update control unit 150 is configured of a pseudo update execution unit 151, a dependency relationship management unit 152, a conversion information management unit 153, and a second sequence control unit 154, and the conversion information management unit 153 includes a pseudo ECU management unit 155 and an interface management unit 156.

The pseudo update execution unit 151 executes software update through operations simulated on the first PF for the ECUs other than those on the first PF. The dependency relationship management unit 152 manages a dependency relationship of each ECU for the ECUs other than those on the first PF.

The conversion information management unit 153 manages a correspondence of information between the first PF and the platforms other than the first PF. The pseudo ECU management unit 155 that the conversion information management unit 153 has is adapted to manage a correspondence between identification information of the ECUs and the software managed by the first PF and identification information of the ECUs and the software managed by the platforms other than the first PF and holds, for example, a pseudo ECU correspondence management table (see FIG. 8) describing the above correspondence. Also, the interface management unit 156 that the conversion information management unit 153 has is adapted to manage a correspondence between commands and Application Programming Interfaces (APIs) in the first PF and commands and APIs on the platforms other than the first PF and holds, for example, an interface conversion table (see FIG. 9) describing the above correspondence. Note that the pseudo ECU correspondence management table and the interface conversion table may be created and held in advance, or alternatively, the content thereof may be automatically generated in accordance with connection of the ECUs and the like in the vehicle system, for example.

The second sequence control unit 154 controls a sequence of the software update in the second PF. Note that the second update control unit 150 includes a sequence control unit that controls a sequence for software update on the platform for each of the platforms other than the first PF, and these sequence control units will be collectively referred to as an N-th sequence control unit. In other words, the second sequence control unit 154 illustrated in FIG. 4 is an example of the N-th sequence control unit, and the following description will be given by applying the reference sign 154 to the N-th sequence control unit as well.

The communication unit 160 controls communication with the outside of the gateway 10. The communication unit 160 is configured of a service management unit 161, a communication I/F 162, a first communication unit 163, a second communication unit 164, and a third communication unit 165.

The service management unit 161 manages services in the first PF. The communication I/F 162 is an interface for communication between applications in the first PF and is, for example, ARA::COM or the like of the first PF. The first communication unit 163 is an interface processing unit for communication between ECUs in the first PF. The first communication unit 163 is a block that processes a communication protocol defined as a standard in the first PF, such as Scalable service-Oriented MiddlewarE over IP (SOME/IP) or Data Distribution Service for Real-time Systems (DDS), for example. The second communication unit 164 is an interface processing unit for communication between ECUs in the second PF. The second communication unit 164 is a block that processes a communication protocol defined as a standard in the second PF, such as ISO14229-1 (UDS), for example. The third communication unit 165 is an interface processing unit for communication between ECUs in the platform other than the first PF and the second PF. The third communication unit 165 is a block that processes a communication protocol unique to an automobile manufacturer, for example. The first communication unit 163, the second communication unit 164, and the third communication unit 165 are interface processing units for communication between ECUs on any of the platforms, and each of these will also be referred to as an N-th communication unit.

Figure 7:
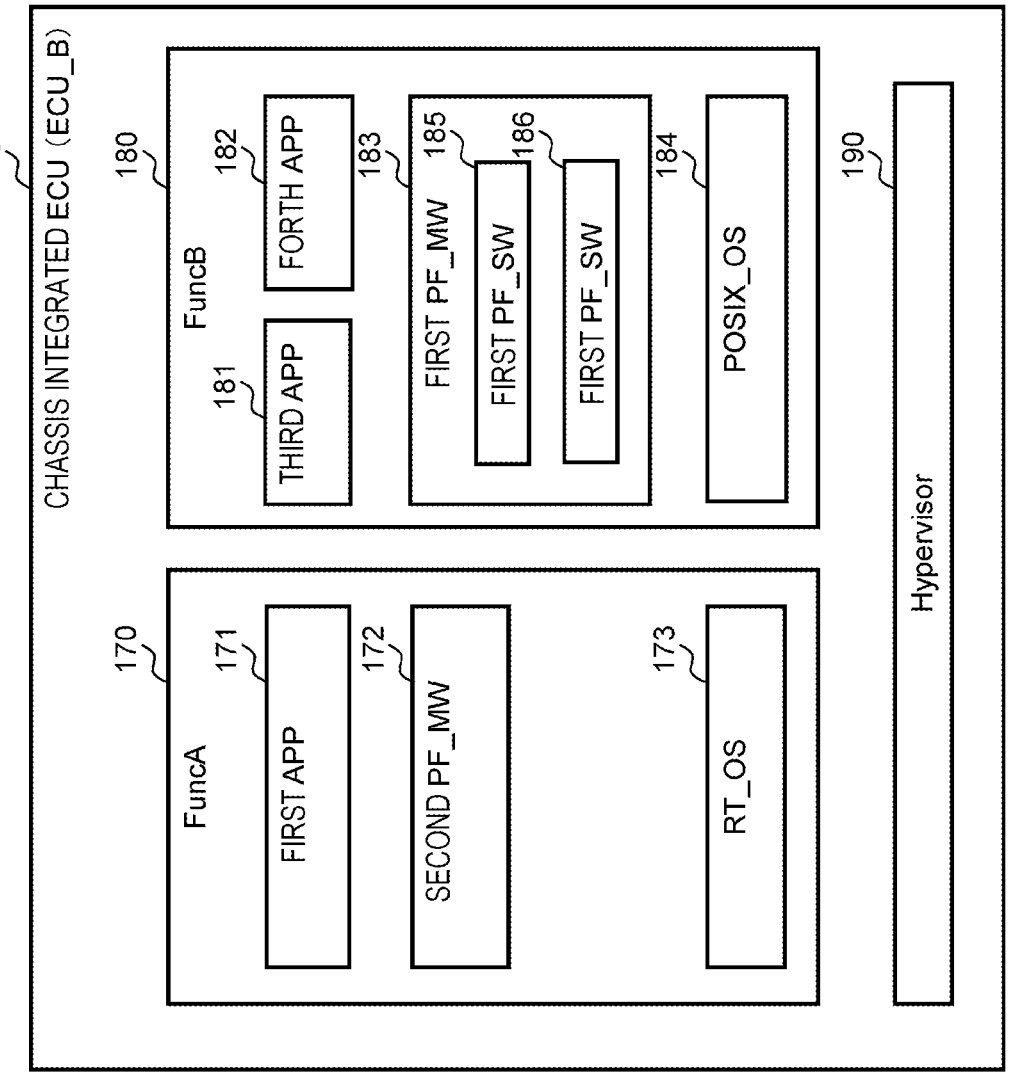
FIG. 7 is a block diagram illustrating an internal configuration example of a chassis integrated ECU 16.

FIG. 7 is a block diagram illustrating an internal configuration example of the chassis integrated ECU 16. The chassis integrated ECU 16 is an ECU obtained by integrating functions of ECUs for the chassis system (braking, steering, and the like) in one ECU and is configured to include a FuncA 170, a FuncB 180, and a hypervisor 190. Among these, the FuncA 170 and the FuncB 180 correspond to the plurality of functions that the chassis integrated ECU 16 has as an integrated ECU, respectively.

The FuncA 170 controls functions that highly require safety, such as braking and steering, for example. The FuncA includes a first APP 171, a second PF_MW 172, and an RTOS 173. The first APP 171 is a software module for controlling the brake. The second PF_MW 172 is a middleware group providing a function of the second PF (AUTOSAR CP). The RTOS 173 is a real-time operating system (OS).

The FuncB 180 controls functions that are not directly involved in traveling safety, such as a diagnosis communication function and a connected function, for example. The FuncB 180 includes a third APP 181, a fourth APP 182, a first PF_MW 183, and a POSIX_OS 184. The third APP 181 is one of applications mounted on the FuncB 180 and is application software related to a diagnosis function, for example. The fourth APP 182 is one of applications different from the third APP 181 mounted on the FuncB 180 and is application software related to a connected function, for example. The first PF_MW 183 is a middleware group providing the functions of the first PF (AUTOSAR AP) and has first PF SWs 185 and 186 as examples of software modules that are in charge of each function included in the functions. Specifically, the first PF_SW 185 is a software module providing a function of the update management unit, and the first PF_SW 186 is a software module providing a function of the network management unit, for example. The POSIX_OS 184 is an OS of Portable Operating System Interface for UNIX (UNIX: registered trademark) (POSIX).

Note that although FIG. 7 illustrates the internal configuration example of the chassis integrated ECU 16 as an internal configuration example of an integrated ECU included in the software update device 10 according to the present embodiment, internal configurations of the other ECUs can be estimated with reference to FIG. 7. For example, it is only necessary to consider that the drive assistance integrated ECU (ECU_A) 13 has a configuration including two Funcs similarly to the chassis integrated ECU 16 since the drive assistance integrated ECU (ECU_A) 13 is an integrated ECU. Moreover, in a case of a single-function ECU such as the engine control ECU 17 or the airbag ECU 19, it is only necessary to consider that the ECU has a configuration including one Func.

(1-2) Data

Hereinafter, a data structure example of a part of data held and distributed by the software update system 1 according to the present embodiment will be described. However, actual data is not limited to the following example, and data described in a table format, for example, may hold data in a table configuration that is different depending on normalization or the like. Additionally, data may be held in a format other than the table, for example.

FIG. 8 is an example of a pseudo ECU correspondence management table. The pseudo ECU correspondence management table is table data describing a correspondence between identification information of the ECUs and the software managed by the first PF and identification information of the ECUs and the software managed by the platforms other than the first PF and is held by the pseudo ECU management unit 155 of the conversion information management unit 153. In the case of FIG. 8, a pseudo ECU correspondence management table 210 includes records in units of ECUs and software as targets, and each record is configured of an identification ID on the first PF 211, ECU identification information 212, and PF identification information 213.

In the pseudo ECU correspondence management table 210, the identification ID on the first PF 211 is an identifier (ID) applied to identify a target on the first PF in a pseudo way. The ECU identification information 212 is identification information of a target identified on the platforms (on the platforms actually managed) other than the first PF, and a name of an ECU is described, for example. The pseudo ECU management unit 155 can convert identification information of a target between the first PF and the other platforms by using the identification ID on the first PF 211 and the ECU identification information 212. The PF identification information 213 is information for identifying a platform that actually manages the target. It is possible to ascertain from FIG. 8, for example, that the ECU that is handled with an identification ID "2" on the first PF in a pseudo way is the "engine control ECU" that is to be managed in the "second PF" in practice. In this manner, the pseudo ECU management unit 155 can use an ID of the ECU or the software converted between the first PF and the other platforms in accordance with the platforms, by referring to the pseudo ECU correspondence management table 210.

FIG. 9 is an example of an interface conversion table. The interface conversion table is table data describing a correspondence between commands and APIs in the first PF and commands and APIs in the platforms other than the first PF and is held by the interface management unit 156 of the conversion information management unit 153. In a case of FIG. 9, the interface conversion table 220 is configured of a first PF control command 221, a PF type 222, and a post-conversion interface 223.

In the interface conversion table 220, the first PF control command 221 is a name of a control command on the first PF. Specifically, the first PF control command 221 corresponds to a control command such as an "SW information acquisition request" or a "data transfer start request". The PF type 222 is information for identifying which of the platforms other than the first PF the corresponding platform is, and specifically, "the second PF", "the third PF", or the like is described. The post-conversion interface 223 is information for identifying an interface corresponding to the control command of the first PF control command 221 in the platform designated by the PF type 222. Which communication unit in the communication unit 160 a request is to be made and what kind of command is to be used for it when the control command is executed is designated by setting of the post-conversion interface 223.

In a case where a control command (first PF control command 221) on the first PF is an "SW information acquisition request" in the interface conversion table 220 in FIG. 9, for example, the post-conversion interface 223 corresponding to the third PF is "third communication unit GetECUVersion". This case means that a request for API (GetECUVersion) for reading version information from the ECU is given to the third communication unit 165 in the third PF. Also, in a case where the first PF control command 221 is a "data transfer start request", for example, the post-conversion interface 223 corresponding to the second PF is "None (OK response)". This is because no API corresponding to the data transfer start request in the first PF is present in the second PF, and in this case, the second PF is set to fixedly return an OK response.

Also, since ECUs that are rewritable during traveling and ECUs that are not rewritable during traveling are present in the second PF in the present embodiment, it is also possible to describe a command after conversion for each type of ECU in the post-conversion interface 223. In a case where the first PF control command 221 is a "package processing request", for example, making a "data transfer request" is set for an ECU that is rewritable during traveling, while "None (OK response)" is set for an ECU that is not rewritable during traveling, as the post-conversion interface 223 corresponding to the second PF. It is possible to control which timing update data temporarily accumulated by the pseudo update execution unit 151 is to be transmitted to the ECU, by describing a command after conversion for each type of ECU in this manner.

Note that the software update device 10 is configured such that information (at least the identification ID on the first PF 211 and the first PF control command 221) managed by the pseudo ECU correspondence management table 210 and the interface conversion table 220 is transmitted to the first update control unit 140, and in this manner, the first update control unit 140 (particularly, the first sequence control unit 141) can generate a control command for the pseudo ECU simulated on the first PF when control is about to be down on the ECU on the platform other than the first PF.

Figure 10:
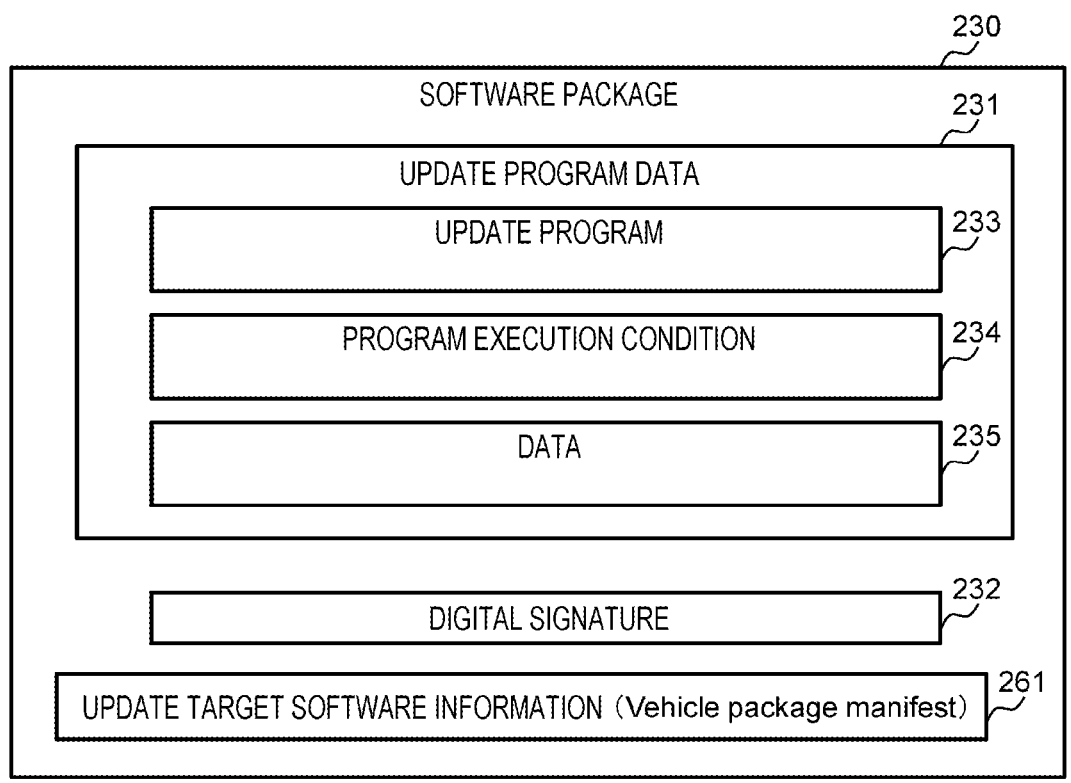
FIG. 10 is a diagram (No. 1) illustrating a configuration example of a software package.

FIGS. 10 and 11 are diagrams (Nos. 1 and 2) illustrating a configuration example of a software package. The software package is a package including an update program and the like of ECUs and is generated by the software management system 4 owned by a supplier, for example. The software package is distributed to the vehicle 2 via the distribution server 3, and update of the program is performed in a target ECU by the update execution unit of the target ECU executing the software package by a predetermined update procedure. FIG. 10 illustrates a software package 230 directed to the first PF, and FIG. 11 illustrates a software package 240 directed to the second PF and a detailed configuration of update target software information 243 included in the software package 240.

The software package 230 illustrated in FIG. 10 is configured to include update program data 231 archiving an update program 233 directed to the first PF, a program execution condition 234, and data 235, a digital signature 232 of the update program data 231, and update target software information 261 that is information related to the software package to be used for the update. The update program 233 is data for rewriting a predetermined ECU in the first PF and is specifically a program after update of the first PF, differential data, and the like. The program execution condition 234 is information indicating an execution condition of the update program 233. The data 235 is data such as parameters used by the update program 233. The update target software information 261 will be described later in description of FIG. 12.

Figure 11A:
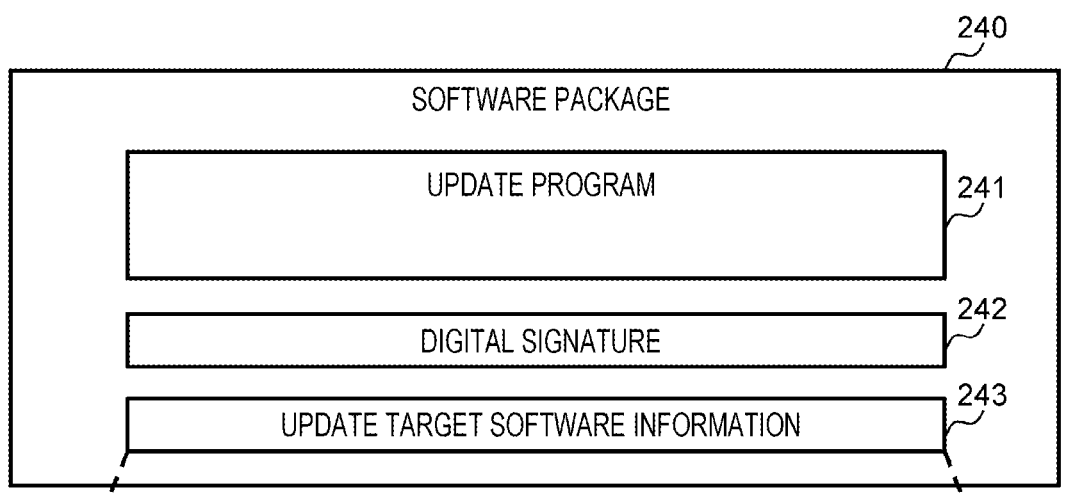
FIGS. 11A and 11B are diagrams (No. 2) illustrating a configuration example of the software package.

The software package 240 illustrated in FIG. 11(A) is configured to include an update program 241 directed to the second PF, a digital signature 242 of an update program 241, and update target software information 243 related to the software package to be used for the update. The update program 241 is data for rewriting a predetermined ECU in the second PF and is specifically a program after update of the second PF, differential data, and the like. Note that the data configuration of the software package does not necessarily depend on the platform of the ECU that is an update target as illustrated in FIGS. 10 and 11, and for example, the software package for the second PF may have a data configuration that is similar to that of the software package 230 in FIG. 10, for example.

Figure 11B:
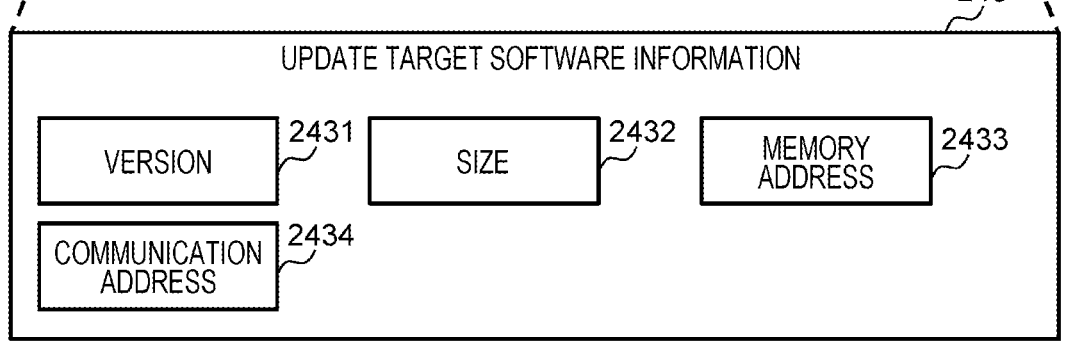

As illustrated in FIG. 11(B), the update target software information 243 includes a version 2431, a size 2432, a memory address 2433, and a communication address 2434. Here, the version 2431 indicates a software version after update of software (update data) that is an update target, and the size 2432 indicates the size of the update data. Also, the memory address 2433 indicates a memory address at which the update data is stored, and the communication address 2434 indicates a communication address foe establishing communication with the update execution unit that processes the update data.

Figure 12:
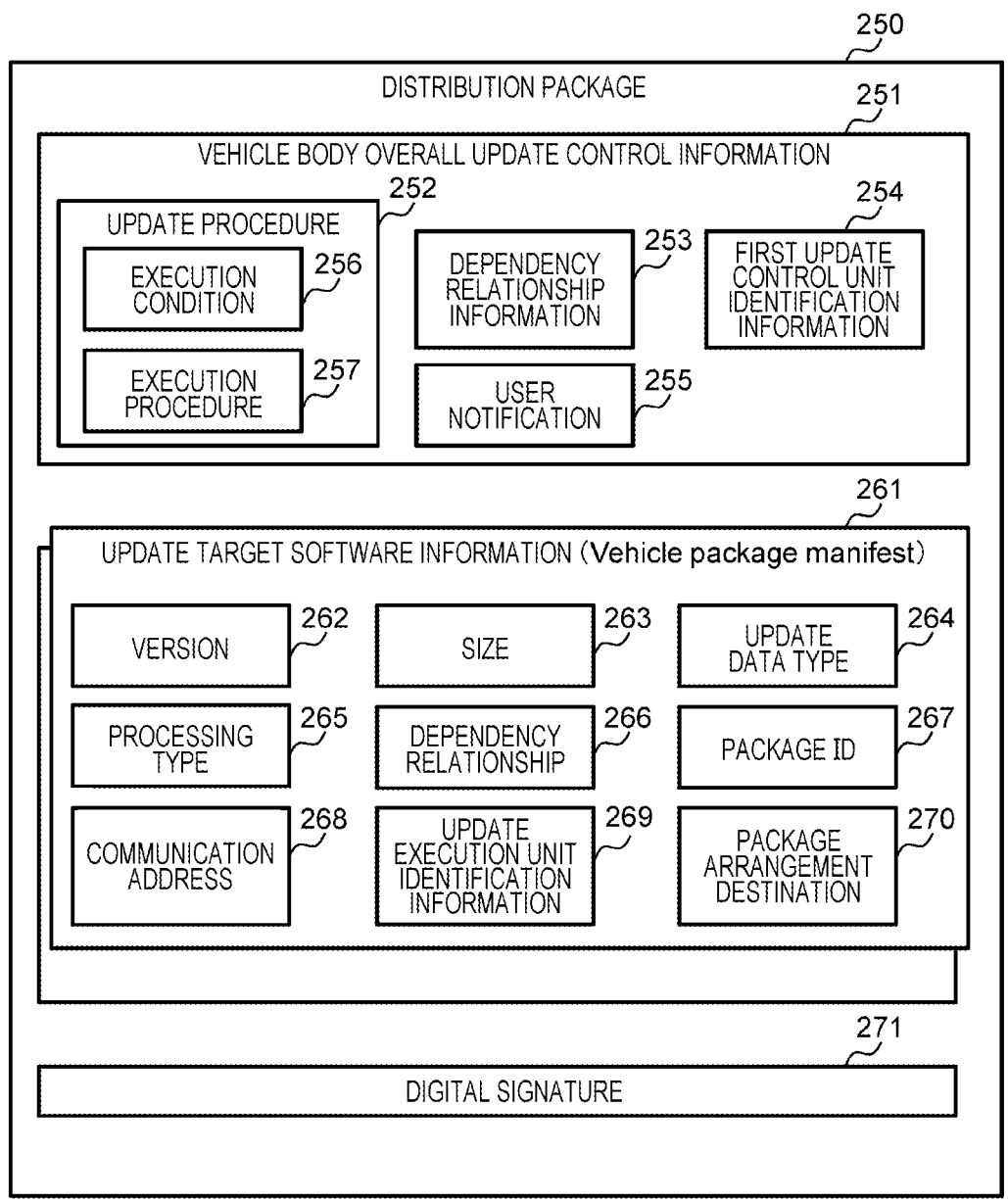
FIG. 12 is a diagram illustrating a configuration example of a distribution package.

FIG. 12 is a diagram illustrating a configuration example of a distribution package. The distribution package is a package used by the first update control unit 140 defined by the first PF in the gateway 10 to control ECU update using a software package, is generated by the distribution server 3, and is distributed to the gateway 10 (see distribution package generation processing, which will be described later in FIG. 20).

The distribution package 250 illustrated in FIG. 12 is configured to include vehicle overall update control information 251 corresponding to entire data to be used for controlling update, update target software information 261 that is information related to the software package to be used for the update, and a digital signature 271.

The vehicle overall update control information 251 includes an update procedure 252, dependency relationship information 253, first update control unit identification information 254, and a user notification 255. Here, the update procedure 252 is data describing an update condition and a procedure, and more specifically, includes an execution condition 256 for processing (installation and software package processing, activation) and an execution procedure 257 for processing (installation and software package processing, activation) in regard to the software package that is an update target. The dependency relationship information 253 indicates a dependency relationship of the software package that is an update target with other software. The first update control unit identification information 254 indicates identification information of the control unit that processes the control information. The user notification 255 indicates content of a notification related to the update for the user.

The update target software information 261 includes a version 262, a size 263, an update data type 264, a processing type 265, a dependency relationship 266, a package ID 267, a communication address 268, update execution unit identification information 269, and a package distribution destination 270. Here, the version 262 indicates a software version after update of the software (update data) that is the update target. The size 263 indicates a size of the update data. The update data type 264 indicates a type of update data such as full update data or differential data. The processing type 265 indicates a type of update processing such as new installation, update, or deletion. The dependency relationship 266 indicates a dependency relationship of software included in the software package with other software. The package ID 267 indicates an identifier of the software package. The communication address 268 indicates a communication address for establishing communication with the update execution unit that processes the software package. The update execution unit identification information 269 indicates identification information of the update execution unit that processes the software package. The package distribution destination 270 indicates a distribution destination (for example, a URL or the like of a server) for acquiring the software package.

(1-3) Processing

Hereinafter, various operations or processing executed by the software update system 1 according to the aforementioned present embodiment will be described in detail.

(1-3-1) Operation at Time of Activation

Figure 13:
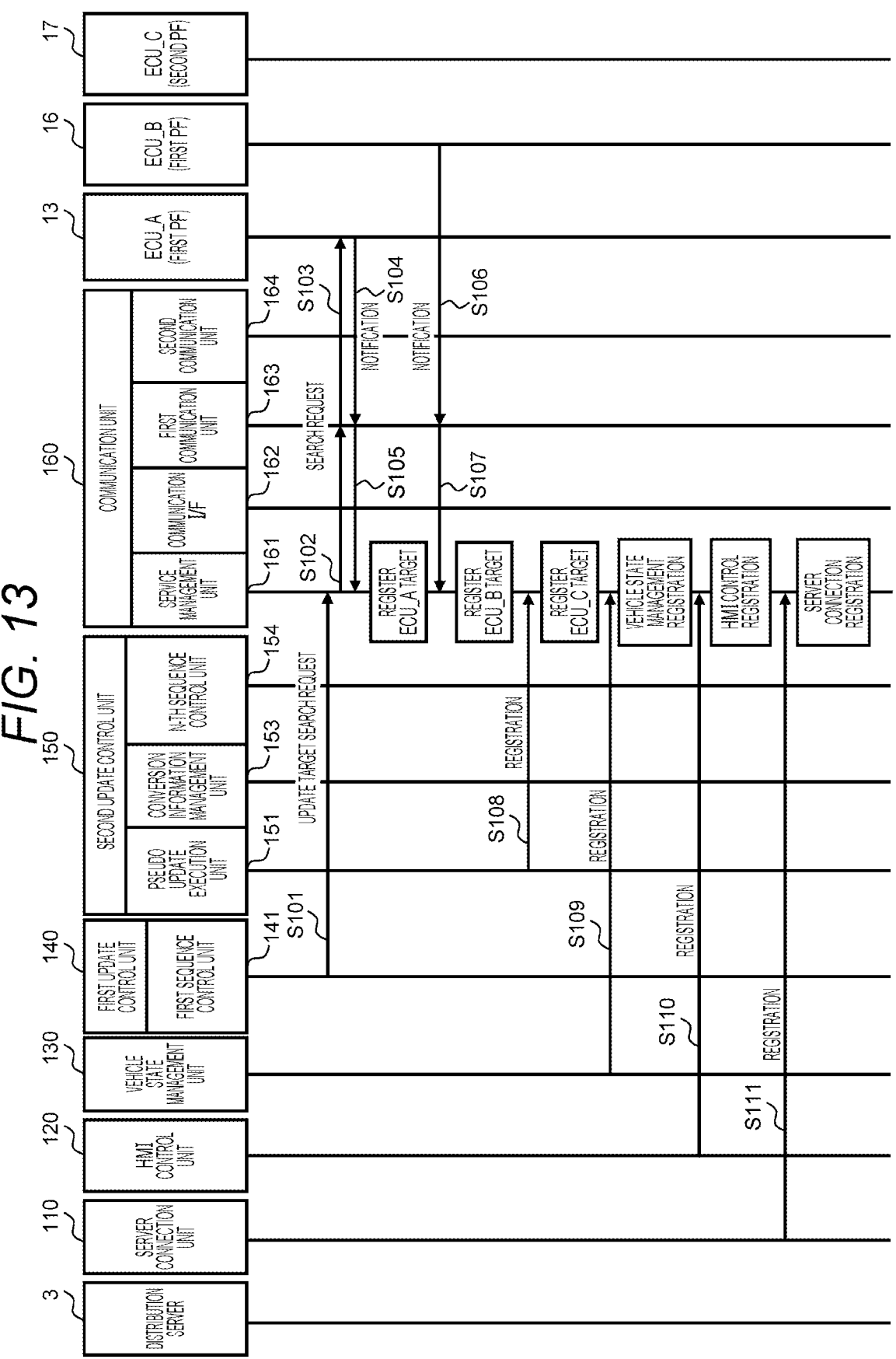
FIG. 13 is a sequence diagram illustrating a procedure example of an operation at the time of system activation in a vehicle 2.

FIG. 13 is a sequence diagram illustrating a procedure example of an operation at the time of system activation in the vehicle 2. The system in the vehicle 2 is triggered by turning-on of a power source or the like of the vehicle 2 and is activated, for example, and at this time, the gateway (software update device) 10 starts an operation at the time of activation illustrated in FIG. 13.

According to FIG. 13, the first sequence control unit 141 of the first update control unit 140 transmits an update target search request for requesting search for a service that is present in the system of the vehicle 2 to the service management unit 161 of the communication unit 160 first (Step S101).

Then, the service management unit 161 that has received the update target search request in Step S101 issues a search request in the system via the first communication unit 163 and receives a notification of a search result (Steps S102 to S105). More specifically, software of each ECU issues a service notification indicating presence of a service of the software itself in response to the search request received from the first communication unit 163. As an example of the search request in Steps S102 to S105, FIG. 13 illustrates a state where the ECU_A 13 on the first PF issues a service notification. In this case, the ECU_A 13 responds to the first communication unit 163 with the service notification in regard to the software update function (update management unit) service that the ECU_A 13 itself has (Step S104), and the first communication unit 163 transfers the received service notification to the service management unit 161 (Step S105).

Next, the service management unit 161 registers the service (the software update service of the ECU_A 13 in this example) indicated by the service notification in management information that the service management unit 161 itself holds (ECU_A target registration), on the basis of the service notification received in Step S105.

Note that the registration of the service in the management information in the service management unit 161 performed at the time of system activation of the vehicle 2 is not limited to one based on the service notification as a response to the update target search request as described above, and the service registration may be performed by another procedure. An example thereof will be described below.

For example, software in an ECU in each platform can voluntarily issue a service notification in the gateway 10 at the time of system activation of the vehicle 2. As an example of such an operation, FIG. 13 illustrates a state where a service notification for the software update function service that the ECU_B 16 has is issued from the ECU_B 16 on the first PF (Step S106 and S107). In this case, the service notification from the ECU_B 16 is transmitted to the service management unit 161 via the first communication unit 163, and the service management unit 161 registers the service (the software update service of the ECU_B 16) indicated by the service notification in the management information that the service management unit itself (ECU_B target registration) holds on the basis of the received service notification.

Also, a service in the system can provide a request for registering the service itself to the service management unit 161 in the gateway 10 at the time of system activation of the vehicle 2. As an example of such an operation, FIG. 13 illustrates a state where the pseudo update execution unit 151 of the second update control unit 150 requests for registration of the software update service that the ECU_C 17 has, for the ECU_C 17 on the second PF that is one of ECUs on the platform (the platform other than the first PF) managed by the pseudo update execution unit 151 itself (Step S108). In this case, the service management unit 161 that has received the registration request from the pseudo update execution unit 151 registers the software update service of the ECU_C 17, the registration of which has been requested, in the management information (ECU_C target registration).

Note that it is possible to provide a request for registering a service to the service management unit 161 from the aforementioned pseudo update execution unit 151 as well in the gateway 10 at the time of system activation of the vehicle 2, and FIG. 13 illustrates such various operation examples. Specifically, the vehicle state management unit 130 provides a request for registering the vehicle state management service for managing various states of the vehicle 2 to the service management unit 161 in Step S109. In this case, the service management unit 161 registers the vehicle state management service, the registration of which has been requested, in the management information (vehicle state management registration). Also, the HMI control unit 120 provides a request for registering the HMI control service for controlling the HMI function to the service management unit 161 in Step S110. In this case, the service management unit 161 registers the HMI control service, the registration of which has been request, in the management information (HMI control registration). Also, the server connection unit 110 provides a request for registering the server connection service for establishing connection to the distribution server 3 to the service management unit 161 in Step S111. In this case, the service management unit 161 registers the server connection service, the registration of which has been requested, in the management information (server connection registration).

As described above, the gateway 10 can register the services that are present in the system at the time of system activation of the vehicle 2 in the management information of the service management unit 161 by the operation at the time of activation illustrated in FIG. 13 being performed.

(1-3-2) Control Command Conversion Processing

Figure 14:
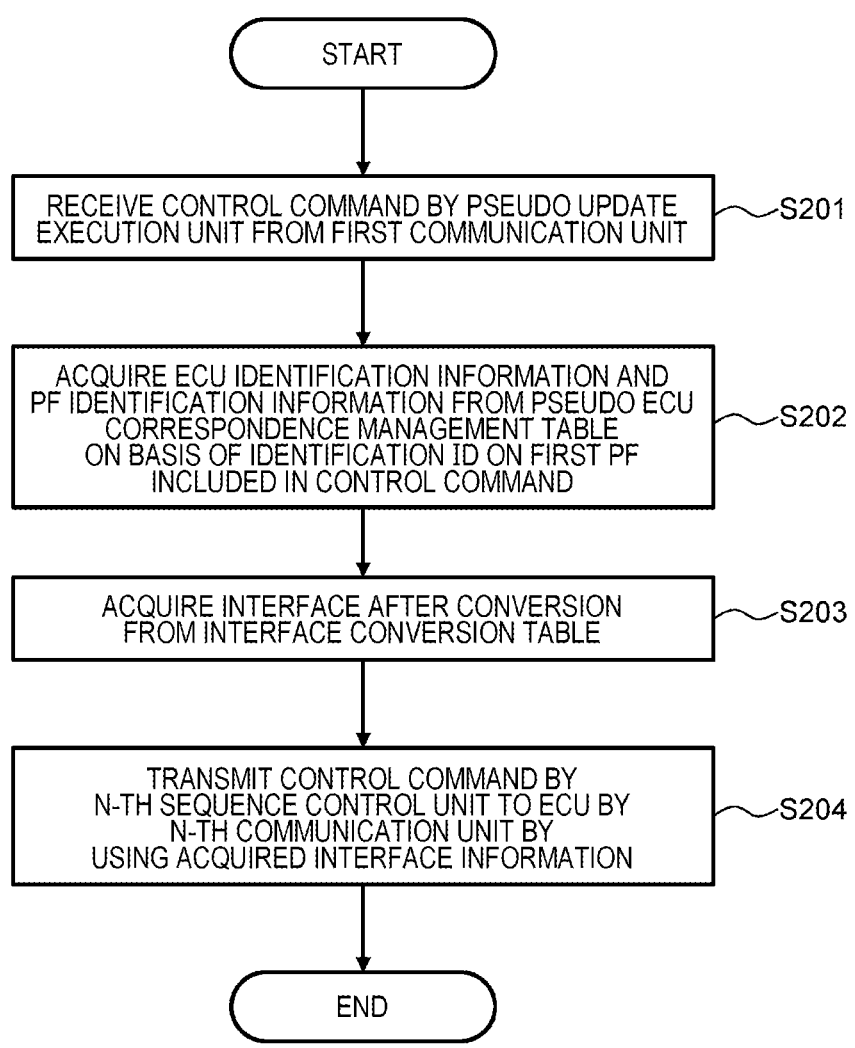
FIG. 14 is a flowchart illustrating a procedure example of control command conversion processing.

FIG. 14 is a flowchart illustrating a procedure example of control command conversion processing. The flowchart in FIG. 14 illustrates a procedure example of control command conversion processing in which the second update control unit 150 converts the control command in a case where the first update control unit 140 (particularly, the first sequence control unit 141) receives the control command for an ECU on a platform other than the first PF.

Before explaining the processing procedure in FIG. 14, an outline of processing performed by the software update device (gateway) 10 according to the present embodiment on a control command will be described first.

As described above with reference to FIG. 6, the software update device (gateway) 10 according to the present embodiment performs overall control of the ECUs on each platform by the first update control unit 140 (first sequence control unit 141) not only dealing with the ECUs on the first PF that can be directly controlled but also dealing with the ECUs on the platforms other than the first PF as ECUs on the first PF in a pseudo way. In the gateway 10 with such a configuration, in regard to a control command for an ECU on the first PF, the first sequence control unit 141 can provide an instruction for executing the command directly to the target ECU via the first communication unit 163. On the other hand, in regard to a control command for an ECU on a platform other than the first PF, the control command is described as a control command for an ECU that is pseudo (pseudo ECU) on the first PF, and it is thus not possible to execute the command as it is. Thus, the first sequence control unit 141 transmits a control command for the pseudo ECU to the second update control unit 150. Then, the pseudo update execution unit 151 of the second update control unit 150 converts the received control command into a control command for the ECU on the actual platform. The second update control unit 150 can provide an instruction for executing the control command after the conversion to the target ECU via the N-th communication unit (second communication unit 164, third communication unit 165) to which the N-th sequence control unit 154 of the corresponding platform corresponds, by performing such conversion processing. Specifically, in a case of a control command for an ECU on the second PF, for example, the second sequence control unit 154 can provide an instruction for executing the control command via the second communication unit 164.

On the basis of the above outline, the processing procedure in FIG. 14 will be described. First, the pseudo update execution unit 151 of the second update control unit 150 receives, from the first communication unit 163, a control command for the pseudo ECU transmitted from the first sequence control unit 141 (Step S201). The control command is configured to include at least the name of the control command on the first PF (for example, the first PF control command 221 in FIG. 9) and an identification ID on the first PF (for example, the identification ID on the first PF 211 in FIG. 8) that is identification information of the pseudo ECU on the first PF.

Next, the pseudo update execution unit 151 refers to the pseudo ECU correspondence management table (FIG. 8) held by the pseudo ECU management unit 155 of the conversion information management unit 153 and acquires ECU identification information 212 and PF identification information 213 corresponding to the identification ID on the first PF 211 included in the control command received in Step S201 (Step S202).

Next, the pseudo update execution unit 151 refers to the interface conversion table (FIG. 9) held in the interface management unit 156 of the conversion information management unit 153 and acquires the corresponding post-conversion interface 223 on the basis of the first PF control command 221 included in the control command received in Step S201 and the PF type 222 that matches the PF identification information 213 acquired in Step S202 (Step S203).

Then, the N-th sequence control unit 154 corresponding to the platform indicated by the PF identification information 213 (this may be the PF type 222) acquired in Step S202 transmits a control command to the target ECU via the N-th communication unit (for example, the second communication unit 164) on the basis of the interface information acquired in Step S203 (Step S204). The ECU that is a transmission target in Step S204 is an ECU indicated by the ECU identification information 212 acquired in Step S202.

The gateway 10 can convert even a control command for an ECU handled on the first PF in a pseudo way into a control command for the ECU on the actual platform and cause the control command to be executed by performing the control command conversion processing illustrated in FIG. 14 as described above and can thus perform overall control on the control command for an ECU on each platform (or software of the ECU) in the system of the vehicle 2.

(1-3-3) Collection of Configuration Information to Reception of Vehicle Package

Figure 15:
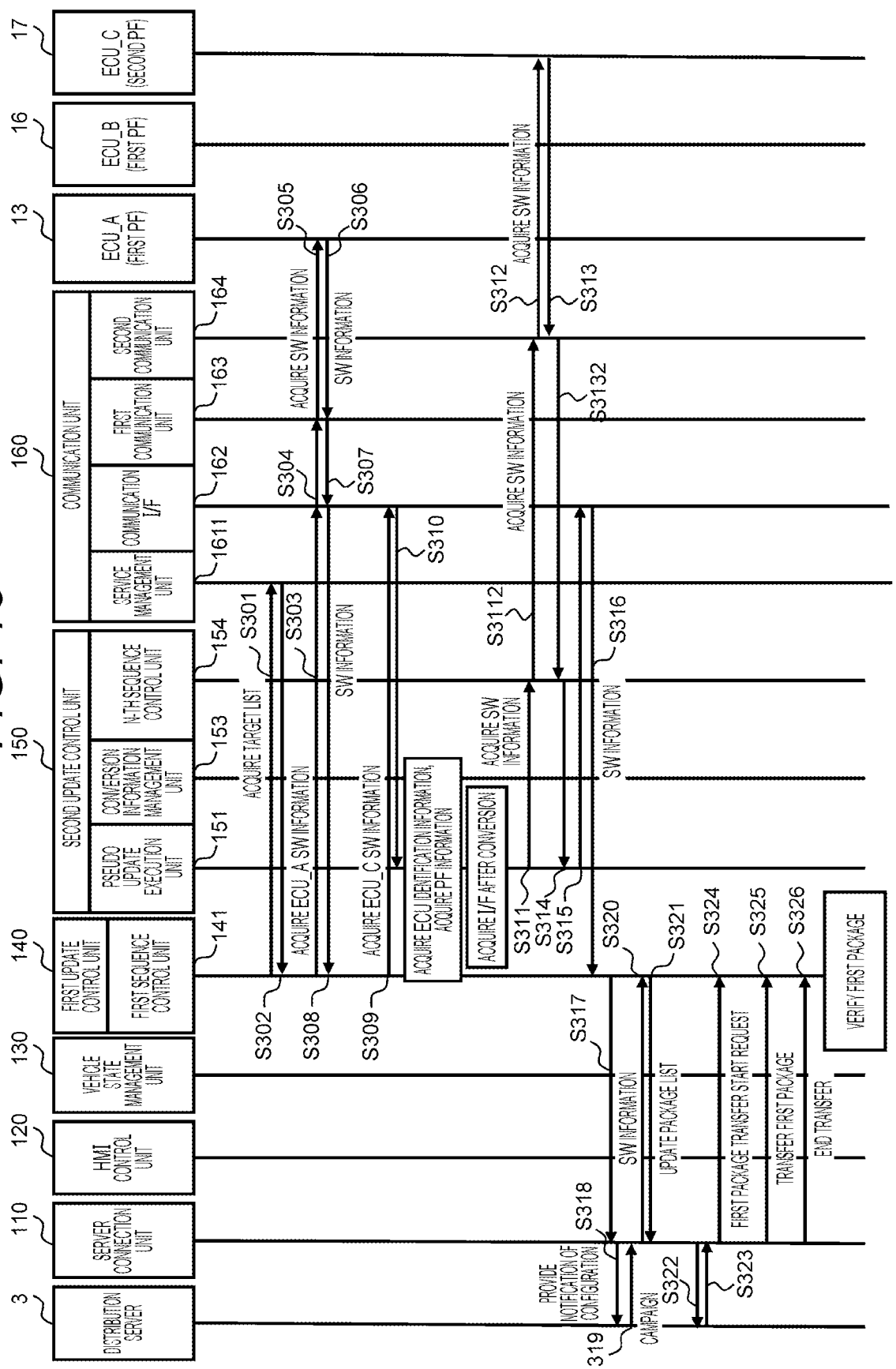
FIG. 15 is a sequence diagram illustrating a procedure example related to collection of configuration information to reception of a vehicle package.

FIG. 15 is a sequence diagram illustrating a procedure example related to collection of configuration information to reception of a vehicle package. More specifically, FIG. 15 illustrates a procedure example for processing in which the first sequence control unit 141 collects software information in the system, the server connection unit 110 transmits the software information as configuration information to the distribution server 3 and synchronizes them, and the first sequence control unit 141 determines a list of vehicle packages (a distribution package and a software package) to be downloaded on the basis of campaign information provided from the distribution server 3 and receives each vehicle package.

According to FIG. 15, the first sequence control unit 141 provides a request for acquiring a target list to the service management unit 161 and acquires a target list from the service management unit 161 first (Steps S301 and S302). The target list that is an acquisition target in Steps S301 and S302 is specifically a list of software update services as target candidates of the configuration synchronization and software update.

Next, the first sequence control unit 141 acquires information of software by using a service in the list acquired in Step S302. Although FIG. 15 illustrates a procedure for acquiring software information (SW information) from the ECU_A 13 and the ECU_B 17 as an example, software information for all the registered services is read and acquired in practice.

First, acquisition of SW information from ECU_A 13 will be described. The request for acquiring the SW information from the first sequence control unit 141 to the ECU_A 13 is made by using an interface for the first PF, and specifically, the first sequence control unit 141 transmits a request for acquiring the SW information of the ECU_A 13 to the communication I/F 162 that is an interface for the communication between applications in the first PF (Step S303).

Here, the ECU_A 13 is an ECU on the first PF, and the communication I/F 162 thus transmits the acquisition request to the first communication unit 163 (Step S304). Then, the first communication unit 163 that has received the acquisition request provides a request for SW information to the ECU_A 13 in accordance with the interface between ECUs defined in the first PF, and the ECU_A 13 responds to the first communication unit 163 with the SW information in response to the request (Steps S305 and S306). Then, the first communication unit 163 converts the SW information received in Step S306 into an application interface of the first PF in accordance with the interface between ECUs defined in the first PF and replies to the communication I/F 162, and the SW information is transmitted from the communication I/F 162 to the first sequence control unit 141 (Steps S307 and S308).

The first sequence control unit 141 can acquire the SW information of the ECU_A 13 through the above processing in Steps S303 to S308.

Next, acquisition of the SW information from the ECU_C 17 will be described. A request for acquiring SW information from the first sequence control unit 141 to the ECU_C 17 is performed by using the interface for the first PF similarly to the request for acquiring SW information provided to the ECU_A 13. Specifically, the first sequence control unit 141 transmits a request for acquiring SW information of the ECU_C 17 to the communication I/F 162 (Step S309). Note that in the request for acquiring SW information transmitted in Step S309, "the request for acquiring SW information for the ECU_C 17 on the second PF" is not directly described, and "the request for acquiring SW information for the pseudo ECU of the ECU_C 17 on the first PF" is described. Therefore, the ECU as a target of acquisition is designated with the identification ID on the first PF (see FIG. 8), and the request content is designated with the first PF control command (see FIG. 9), in the above request for acquiring SW information.

The communication I/F 162 that has received the request for acquiring SW information in Step S309 transmits the request for acquiring SW information to the pseudo update execution unit 151 of the second update control unit 150 without transmitting it directly to the second communication unit 164 for the second PF since the ECU as a target of acquisition has been designated with the identification ID on the first PF (since the ECU_C 17 that is an actual target of acquisition is an ECU on the second PF) (Step S310).

Then, the pseudo update execution unit 151 that has received the request for acquiring SW information calls the conversion information management unit 153 and acquires the ECU identification information and the PF identification information corresponding to the identification ID on the first PF designated by the acquisition request (acquisition of ECU identification information, acquisition of PF information). Detailed description will be given. The pseudo update execution unit 151 acquires the corresponding ECU identification information 212 and PF identification information 213 as information indicating the ECU as the actual target of acquisition of SW information and the platform thereof (second PF) with reference to the pseudo ECU correspondence management table 210 held by the pseudo ECU management unit 155 by using the identification ID on the first PF designated by the acquisition request as a key. Moreover, the pseudo update execution unit 151 calls the conversion information management unit 153 and acquires the post-conversion interface corresponding to the first PF control command designated by the above acquisition request (acquisition of I/F after conversion). Detailed description will be given. The pseudo update execution unit 151 acquires the corresponding post-conversion interface 223 as interface information needed to request the SW information from the ECU_C 17 on the second PF with reference to the interface conversion table 220 held by the interface management unit 156 by using the first PF control command designated by the above acquisition request and the PF type information acquired in the previous PF information acquisition as keys.

Next, the pseudo update execution unit 151 provides a request for acquiring SW information of the ECU_C 17 to the second communication unit 164 via the second sequence control unit 154 by using the information acquired through the aforementioned acquisition of the ECU identification information, acquisition of the PF information, and acquisition of the post-conversion I/F (Steps S311 and S3112). Then, the second communication unit 164 that has received the acquisition request provides a request for the SW information to the ECU_C 17 by using the standard I/F of the second PF, and the ECU_C 17 responds to the second communication unit 164 with the SW information in response to the request (Steps S312 and S313). Then, the second communication unit 164 replies the SW information received in Step S313 to the pseudo update execution unit 151 via the second sequence control unit 154 by using a communication protocol such as UDS, for example (Steps S3132 and S314).

Thereafter, the pseudo update execution unit 151 converts the SW information of the ECU_C 17 received in Step S314 into the interface on the first PF and transmits it to the communication I/F 162 (Step S315), and the communication I/F 162 replies the received SW information as a response to the request for acquiring SW information in Step S309 to the first sequence control unit 141 (Step S316).

The first sequence control unit 141 can acquire the SW information from the ECU_C 17 on another platform simulated on the first PF as well through the above processing in Steps S309 to S316.

After the software information is acquired from all the services registered in the system in this manner, the first sequence control unit 141 transmits each piece of collected software information to the server connection unit 110 (Step S317), and the server connection unit 110 notifies the distribution server 3 of the received software information as configuration information (Step S318).

Next, the distribution server 3 checks whether there is software that can be updated on the basis of the configuration information received in Step S318 and responds to the server connection unit 110 with the campaign information for performing update in a case where there is software that can be updated (downloaded from the side of the vehicle 2) (Step S319).

Next, the server connection unit 110 provides a request for reading a list of vehicle packages (update packages) to be downloaded from the received campaign information to the first sequence control unit 141 (Step S320). Although description of a detailed method in which the first sequence control unit 141 reads a list of update packages to be downloaded will be omitted, the first sequence control unit 141 may cause the HMI control unit 120 to display a list of campaigns on the HMI, for example, and allow the user to select a vehicle package (update package) that the user desires to download, for example. Then, the first sequence control unit 141 responds to the server connection unit 110 with the list of update packages to be downloaded (Step S321). Then, the server connection unit 110 provides a request for providing an update package to the distribution server 3 on the basis of the list of the update packages in the response (Step S322).

Next, the distribution server 3 transmits the update package requested in Step S322 to the server connection unit 110 (Step S323). Note that in a case where a plurality of update packages are requested in Step S322, the update packages are transmitted at once or in a sequential manner in Step S323, but FIG. 15 illustrates, as an example, transmission of one update package (first package) for simplicity.

The server connection unit 110 that has received the update package from the distribution server 3 provides a request for starting transfer of the update package (first package) to the first sequence control unit 141, and once permission is obtained, the first package is transferred to the first sequence control unit 141 (Step S324 and S325). Then, once the transfer of the first package ends, the server connection unit 110 notifies the first sequence control unit 141 of completion of the transfer of the first package (Step S326).

Then, once the notification of completion of transfer of the first package is received, the first sequence control unit 141 verifies the received first package (first package verification). Examples of specific content of the verification include verification of a digital signature included in the package to check if the update package is a proper update package.

The first sequence control unit 141 can acquire the information (campaign information) related to the software that can be updated in the system and download the arbitrary vehicle package (update package) selected from the campaign from the distribution server 3 through the above processing in Steps S317 to S326.

(1-3-4) Installation and Activation

Figure 16:
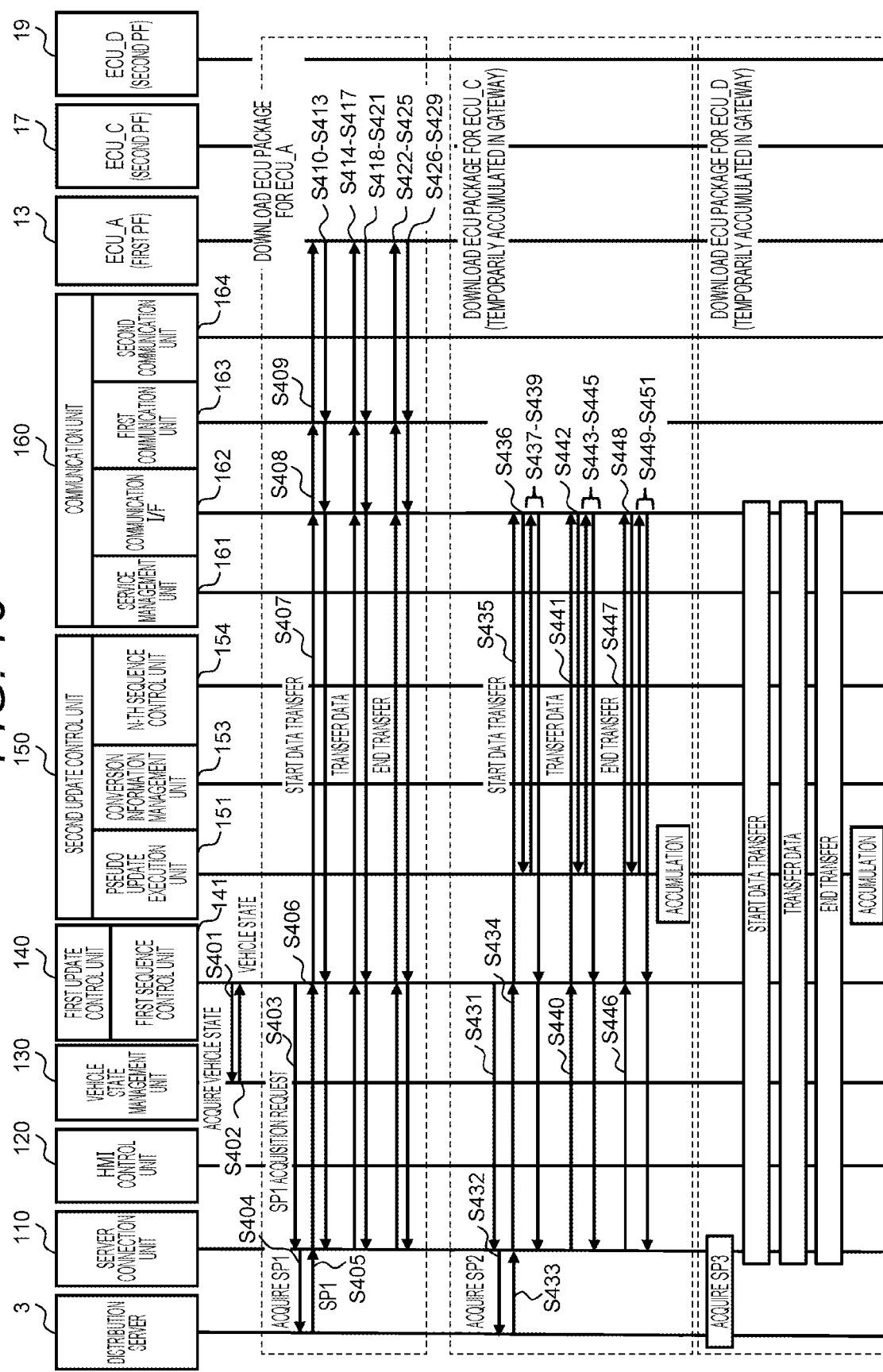
FIG. 16 is a sequence diagram (No. 1) illustrating a procedure example in installation and activation of a software package for updating an ECU.
Figure 17:
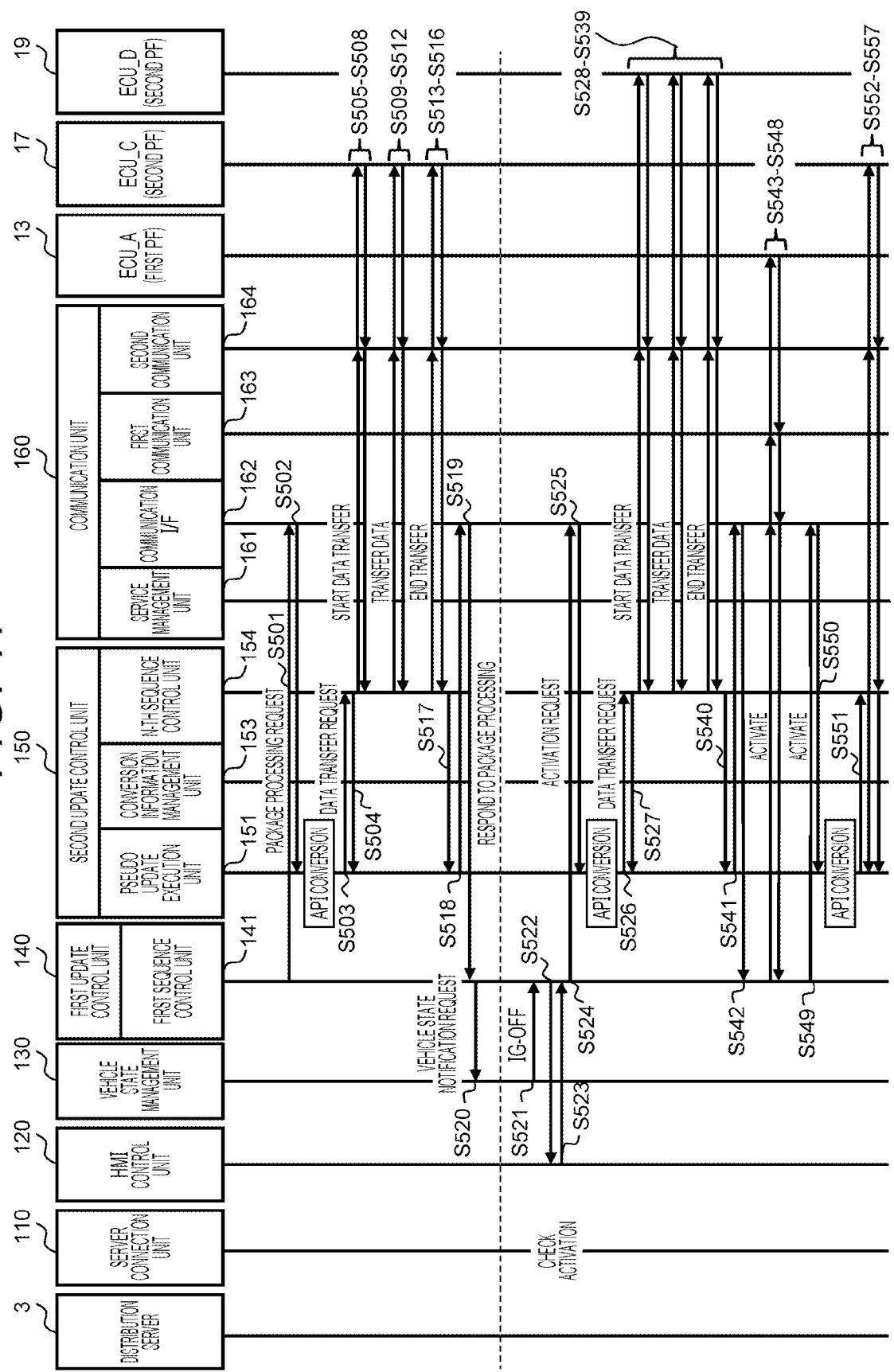
FIG. 17 is a sequence diagram (No. 2) illustrating the procedure example in installation and activation of the software package for updating the ECU.

FIGS. 16 and 17 are sequence diagrams (Nos. 1 and 2) illustrating a procedure example for installation and activation of a software package for updating an ECU. As an assumption of the processing illustrated in FIGS. 16 and 17, it is assumed that the update package downloaded by the first sequence control unit 141 from the distribution server 3 through the processing illustrated in FIG. 15 includes information for updating the ECU_A 13, the ECU_C 17, and the ECU_D 19. Also, FIGS. 16 and 17 illustrate a procedure example for processing in which software packages (SP1 to SP3) for updating each ECU are downloaded from the distribution server 3 and are then installed (data transfer) in each ECU, and the functions of the updated ECU are activated (validated) in a case where permission to execute activation is obtained from a driver. Note that although details will be described later, the timing at which data is transferred to the ECU may be after the permission to execute activation is obtained.

First, according to FIG. 16, the vehicle state management unit 130 reads information (vehicle state) related to a state of the vehicle 2 in response to the first sequence control unit 141 providing a request for acquiring a vehicle state to the vehicle state management unit 130, and transmits it to the first sequence control unit 141 (Steps S401 and S402). Although the vehicle state management unit 130 reads the vehicle state via a service interface in a strict sense, illustration thereof is omitted in FIG. 16.

Next, the vehicle state management unit 130 notifies the first sequence control unit 141 of the state of the vehicle 2, and the first sequence control unit 141 determines whether or not to start the installation processing on the basis of the acquired vehicle state (not illustrated). Then, in a case where the first sequence control unit 141 determines that the installation processing may be started, the first sequence control unit 141 starts to download the software package (SP) for updating the ECU, which will be described later.

The processing procedure for downloading the software package for updating the ECU differs depending on whether the target ECU is an ECU on the first PF. In other words, processing procedures are different for downloading of the ECU package (SP1) for the ECU_A 13 and for downloading of the ECU package (SP2) for the ECU_C 17 or the ECU package (SP2) for the ECU_D 19 in FIG. 16.

In the processing for downloading the ECU package (SP1) for the ECU_A 13, the first sequence control unit 141 provides a request for acquiring the SP1 to the server connection unit 110 first (Step S403). The server connection unit 110 that has received the request receives the SP1 from the distribution server 3 by providing a request for acquiring the SP1 to the distribution server 3 (Steps S404 and S405).

Next, the server connection unit 110 provides a notification regarding the start of data transfer of the SP1. Specifically, the server connection unit 110 notifies the first sequence control unit 141 of the transfer start of the SP1, and the first sequence control unit 141 notifies the update management unit of the ECU_A 13 on the first PF of the transfer start via the communication I/F 162 and the first communication unit 163 (Steps S406 to S409). Then, a response to the notification of the transfer start is transmitted from the ECU_A 13 to the server connection unit 110 via the first communication unit 163, the communication I/F 162, and the first sequence control unit 141 (Steps S410 to S413).

Next, the server connection unit 110 transfers the data of the SP1 to the ECU_A 13. Specifically, the server connection unit 110 transmits the SP1 to the first sequence control unit 141, and the first sequence control unit 141 transfers the SP1 to the update management unit of the ECU_A 13 on the first PF via the communication I/F 162 and the first communication unit 163 (Steps S414 to S417). Then, a response to the data transfer is transmitted from the ECU_A 13 to the server connection unit 110 via the first communication unit 163, the communication I/F 162, and the first sequence control unit 141 (Steps S418 to S421).

Then, once the data transfer of the SP1 ends, the server connection unit 110 provides a notification of an end of the data transfer of the SP1. The notification is transferred to the update management unit of the ECU_A 13 via the first sequence control unit 141, the communication I/F 162, and the first communication unit 163 similarly to the notification of the start of the data transfer (Steps S422 to S425), and the response thereto is transmitted to the server connection unit 110 (Steps S426 to S429).

As described above, all the processing for the downloading of the ECU package (SP1) for the ECU_A 13 on the first PF can be executed on the first PF, and the update management unit of the ECU_A 13 can install the received SP1.

On the other hand, in the downloading of the ECU package for the ECU on a platform other than the first PF, the downloaded software package is not immediately transferred to the target ECU but is temporarily accumulated in the gateway 10 (pseudo update execution unit 151) until a predetermined condition is satisfied (until a package processing request or an activation request, which will be described in FIG. 17, is issued). As an example of such a processing procedure, a processing procedure for downloading the ECU package (SP2) for the ECU_C 17 will be described below.

In the processing for downloading the ECU package (SP2) for the ECU_C 17, the first sequence control unit 141 provides a request for acquiring the SP2 to the server connection unit 110 first (Step S431). The server connection unit 110 that has received the request receives the SP1 from the distribution server 3 by providing a request for acquiring the SP1 to the distribution server 3 (Steps S432 and S433).

Next, the server connection unit 110 provides a notification regarding the start of data transfer of the SP2. Specifically, the server connection unit 110 notifies the first sequence control unit 141 of the start of the transfer of the SP2, and the first sequence control unit 141 notifies the pseudo update execution unit 151 recognized as a pseudo update management unit (pseudo update management unit) of the ECU_C 17 on the first PF of the transfer start via the communication I/F 162 (Steps S434 to S436). Note that the pseudo update execution unit 151 that has received the notification of the transfer start of the SP2 in Step S436 acquires the ECU identification information, the PF information, and the post-conversion I/F related to the data transfer of the SP2 by performing processing that is similar to that when the request for acquiring the SW information of the ECU_C 17 is received in Step S310 in FIG. 15. Thereafter, a response to the notification of the transfer start is transmitted from the pseudo update execution unit 151 to the server connection unit 110 via the communication I/F 162 and the first sequence control unit 141 (Steps S437 to S439).

Next, the server connection unit 110 transmits the SP2 to the first sequence control unit 141 as processing of data transfer, and the first sequence control unit 141 transfers the SP2 to the pseudo update execution unit 151 that is a pseudo update management unit of the ECU_C 17 on the first PF via the communication I/F 162 (Steps S440 to S442). At this time, the pseudo update execution unit 151 holds the SP2 received in Step S442 in the pseudo update execution unit 151 itself and transmits a response to the data transfer to the server connection unit 110 via the communication I/F 162 and the first sequence control unit 141 (Steps S443 to S445).

Then, once the data transfer of the SP2 ends, the server connection unit 110 notifies the first sequence control unit 141 of the end of the data transfer of the SP2, and the first sequence control unit 141 transfers the notification to the pseudo update execution unit 151 that is a pseudo update management unit of the ECU_C 17 on the first PF via the communication I/F 162 (Steps S446 to S448). Then, a response to the notification is transmitted to the server connection unit 110 via the communication I/F 162 and the first sequence control unit 141 (Steps S449 to S451). As described above in Step S442, the pseudo update execution unit 151 holds the SP2 received at the time of the data transfer in the pseudo update execution unit 151 itself, and the entire data of the SP2 is accumulated in the pseudo update execution unit 151 at the time of the end of the data transfer of the SP2.

Also, although FIG. 16 illustrates the processing for downloading the ECU package (SP3) for the ECU_D 19 on the second PF in a simplified manner after Step S451, the series of processing is similar to the processing (Steps S431 to S451) for downloading the ECU package (SP2) for the ECU_C 17, and description thereof will thus be omitted.

As described above, the software package targeted at the ECU (pseudo ECU) on the platform other than the first PF is temporarily accumulated in the pseudo update execution unit 151 after being downloaded. At this timing, each software package has not been data-transferred and installed in the target ECU. As post processing on these software packages, it is possible to transfer data to the target ECU and install it at various timings in the present embodiment. The data transfer timings can be set in the interface conversion table 220 in FIG. 9. As a specific example, the ECU package for the ECU_C 17 is triggered by a package processing request issued by the first sequence control unit 141 and is executed, and the ECU package for the ECU_D 19 is triggered by the activation request issued after checking activation and is executed, in FIG. 17.

The processing illustrated in FIG. 17 will be described. First, the processing in Steps S501 to S520 illustrated in FIG. 17 is processing after the ECU package for the ECU_C 17 is downloaded.

According to FIG. 17, the first sequence control unit 141 provides a request for performing package processing on the first PF to the ECU_C 17 first. Specifically, the first sequence control unit 141 transmits a package processing request directed to the ECU_C 17 to the communication I/F 162 (Step S501), and the communication I/F 162 transfers the request to the pseudo update execution unit 151 since the request is directed to the ECU_C 17 (Step S502).

Next, the pseudo update execution unit 151 that has received the request for performing package processing on the first PF refers to the interface conversion table and converts the received request into a request on the first PF (API conversion). Here, if the ECU_C 17 is assumed to be an ECU that is rewritable during traveling, the post-conversion interface 223 in the second PF corresponding to the first PF control command 221 in the "package processing request" is a "data transfer request [in a case of ECU that is rewritable during traveling]" in a case where the interface conversion table 220 in FIG. 9 is used. Therefore, the pseudo update execution unit 151 that has received the package processing request provides, to the second sequence control unit 154, a "data transfer request" to the ECU_C 17 by performing the API conversion (Step S503). In Step S503, the pseudo update execution unit 151 extracts update data from the software package (SP2) accumulated in the pseudo update execution unit 151 itself, for example, adds it to the data transfer request, and transmits them to the second sequence control unit 154.

Then, the second sequence control unit 154 returns the response to the data transfer request in Step S503 to the pseudo update execution unit 151 (Step S504) and then provides a request for starting data transfer of the SP2 to the ECU_C 17 via the second communication unit 164 (Steps S505 and S506).

Then, once the response to the request for starting the data transfer is obtained (Steps S507 and S508), the second sequence control unit 154 transfers the data of the SP2 to the update management unit of the ECU_C 17 via the second communication unit 164 (Steps S509 and S510). Also, the response of the ECU_C 17 to the data transfer is transmitted to the second sequence control unit 154 via the second communication unit 164 at the time of the data transfer (Steps S511 and S512).

Then, once the data transfer of the SP2 ends, the second sequence control unit 154 provides a notification of the end of the data transfer of the SP2. The notification is transferred to the update management unit of the ECU_C 17 via the second communication unit 164 similarly to the case of the notification of the start of the data transfer (Steps S513 and S514), and the response thereto is transmitted to the second sequence control unit 154 (Steps S515 and S516).

Next, the second sequence control unit 154 that has received the response of the end of the data transfer in Step S516 answers the pseudo update execution unit 151 with a result of the data transfer request in Step S503 (Step S517). Then, the pseudo update execution unit 151 answers the first sequence control unit 141 with a result of the package processing request in Steps S501 and S502 via the communication I/F 162 (Steps S518 and S519).

The ECU package (SP2) for the ECU_C 17 downloaded from the distribution server 3 and accumulated in the pseudo update execution unit 151 through the above processing in Steps S501 to S519 is transferred to the target ECU_C 17 and can be installed therein. Thereafter, the first sequence control unit 141 transmits a request for providing a notification of a vehicle state to the vehicle state management unit 130 to ask it to provide a notification when a state where activation is possible is achieved, in order to recognize a timing at which the activation of the installed update package is checked (Step S520).

Next, processing in and after Step S521 in FIG. 17 will be described. The processing in and after Step S521 is processing related to activation of the update package. Specifically, Steps S521 to S523 are processing related to checking of activation, Steps S524 to S542 are processing related to data transfer and activation of the update program (ECU package; SP3) for the ECU_D 19, Steps S543 to S548 are processing related to activation of the update program (ECU package; SP1) for the ECU_A 13, and Steps S549 to S557 are processing related to activation of the update program (ECU package; SP2) for the ECU_C 17.

When the ignition is turned OFF, for example, as a trigger for checking activation, the vehicle state management unit 130 notifies the first sequence control unit 141 of the fact that the vehicle state has been changed to a state where activation is possible (Step S521). The first sequence control unit 141 that has received the notification provides a request for displaying a checking screen for asking the driver whether or not it is possible to execute activation to the HMI control unit 120 (Step S522). Once permission to execute activation is obtained from the driver on the checking screen, the HMI control unit 120 replies a result of checking activation to the first sequence control unit 141 (Step S523). Although a display mode on the checking screen is not particularly limited, a list of software packages waiting for activation may be displayed such that the driver can select a permission target, or the driver can collectively permit the activation, for example. Also, there may be update software that does not require driver's permission for activation depending on the type of the update software.

Hereinafter, description will be continued on the assumption that permission for activation of all the software packages in all the SP1 to SP3 has been obtained through the processing in Steps S521 to S523.

In regard to the update program for the ECU_D 19, the first sequence control unit 141 provides a request for activating the update program of the ECU_D 19 to the pseudo update execution unit 151 via the communication I/F 162 in response to the permission for activation being obtained (Steps S524 and S525). Since the activation request from the first sequence control unit 141 is made as a request on the first PF, the pseudo update execution unit 151 that has received the request performs API conversion similarly to that when the package processing request on the first PF is received in Step S502, and converts the received activation request to a request on the second PF. Specifically, the post-conversion interface 223 on the second PF corresponding to the first PF control command 221 of the "activation request" in the interface conversion table 220 in FIG. 9 is a "data transfer request of the second communication unit [in a case of ECU that is not rewritable during traveling]".

Here, since the ECU_D 19 is an ECU that is not rewritable during traveling as described above in FIG. 5, the pseudo update execution unit 151 transmits a data transfer request to the second sequence control unit 154, and the second sequence control unit 154 provides a data transfer request of the downloaded software package (SP3) to the ECU_D 19 via the second communication unit 164 (Steps S526 and S527).

Note that a series of processing procedures of the data transfer from the second sequence control unit 154 to the ECU_D 19 after receiving the data transfer request from the pseudo update execution unit 151 is similar to those in which the ECU of the transfer destination is changed in the processing of Steps S505 to S517 described above with respect to the data transfer to ECU_C 17, and thus, detailed processing is omitted (Steps S528 to S540).

Then, once the second sequence control unit 154 answers the pseudo update execution unit 151 with a result of the data transfer request in Step S540, the pseudo update execution unit 151 answers the first sequence control unit 141 with a result of the activation request in Steps S524 and S525 via the communication I/F 162 (Steps S541 and S542).

It is possible to transfer the update program (ECU package; SP3) for the ECU_D 19 from the pseudo update execution unit 151 to the ECU_D 19 and to install and then activate it through the above processing in Steps S524 to S542.

Next, the first sequence control unit 141 provides an activation request to the ECU_A 13 via the communication I/F 162 and the first communication unit 163 in response to the permission of activation being obtained for the update program for the ECU_A 13. Since the ECU_A 13 is an ECU on the first PF, there is no need to perform the processing via the pseudo update execution unit 151 like the ECU_D 19 as described above, the response is sent to the first sequence control unit 141 from the ECU_A 13 after execution of activation, and the activation of the update program for the ECU_A 13 is completed (Steps S543 to S548).

Next, the first sequence control unit 141 provides a request for activating the update program of the ECU_C 17 to the pseudo update execution unit 151 via the communication I/F 162 in response to the permission of activation being obtained for the update program for the ECU_C 17 (Steps S549 and S550). The pseudo update execution unit 151 that has received the request performs API conversion and converts the received activation request into a request on the second PF. Note that since the ECU_C 17 is an ECU that is rewritable during traveling and the target update program has already been transferred to the ECU_C 17 and installed therein through the processing in Steps S503 to S517, there is no need to transfer data, and it is only necessary to transfer the activation request to the ECU_C 17. This is also confirmed from the post-conversion interface 223 in the second PF corresponding to the first PF control command 221 of the "activation request" being "an activation request of the second communication unit [in a case of an ECU that is rewritable during traveling]" in the interface conversion table 220 in FIG. 9.

Therefore, the pseudo update execution unit 151 transmits an activation request to the second sequence control unit 154, and the second sequence control unit 154 transfers the activation request to the ECU_C 17 via the second communication unit 164 (Steps S551 to S554). Then, after the update program (SP2) is validated in the ECU_C 17, the result is transmitted from the ECU_C 17 to the second sequence control unit 154 via the second communication unit 164 (Steps S555 and S556), and further, the second sequence control unit 154 answers the pseudo update execution unit 151 with a result of the activation request in Steps S551 and S552 (Step S557). Note that although illustration is omitted in FIG. 17, the pseudo update execution unit 151 further answers the first sequence control unit 141 with a result of the activation request in Steps S549 to S550 via the communication I/F 162 thereafter.

It is possible to validate (activate) the update program (ECU package; SP2) for the ECU_C 17 as well in the ECU_C 17 through the above processing in Steps S549 to S557 and the like.

(1-3-5) Ending Processing

Figure 18:
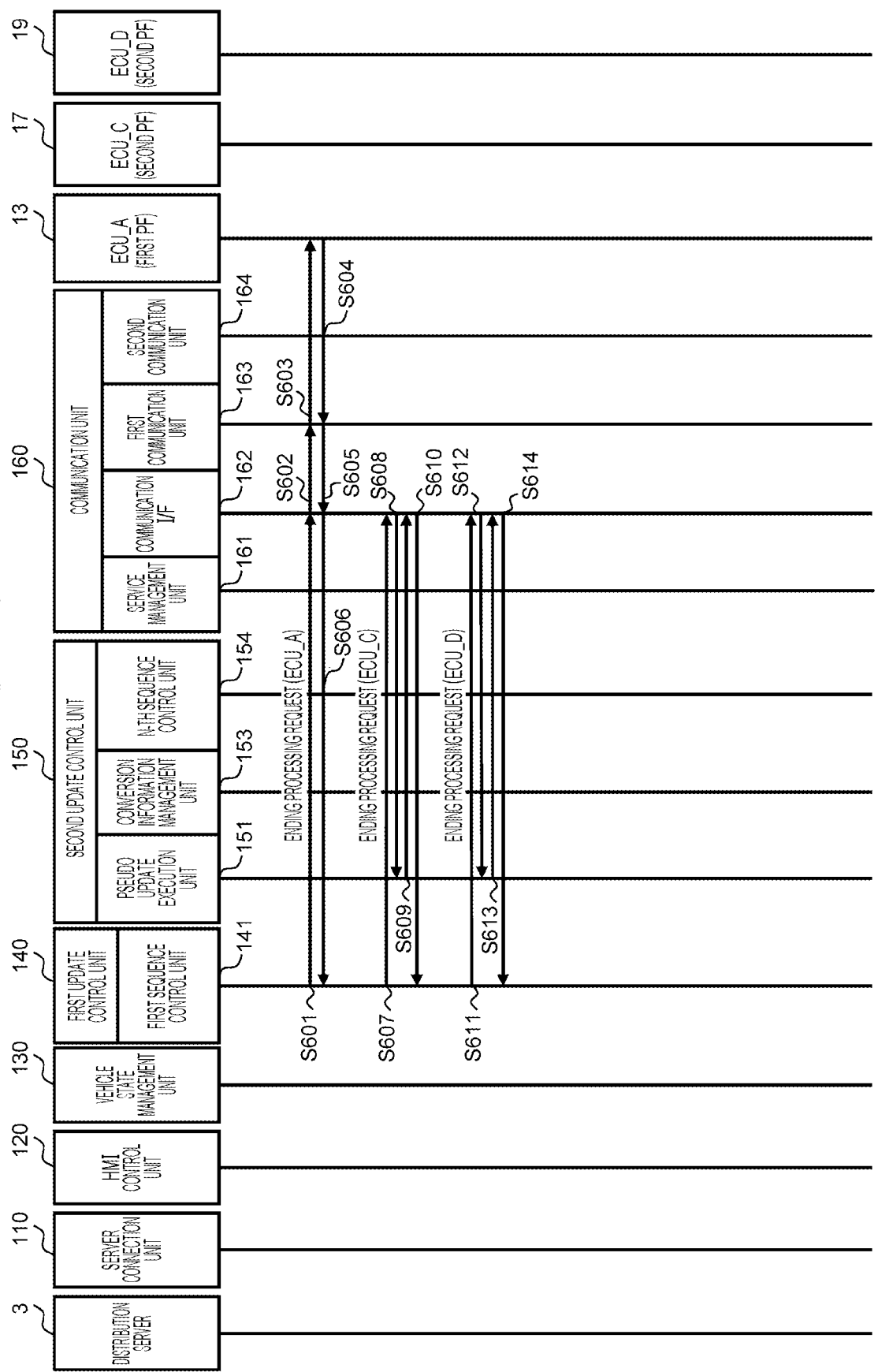
FIG. 18 is a sequence diagram illustrating a procedure example in ending processing.

FIG. 18 is a sequence diagram illustrating a procedure example in ending processing. FIG. 18 illustrates a procedure example when each ECU handled on the first PF is ended. The procedure for the ending processing differs depending on which of an ECU on the first PF and a pseudo ECU simulated on the first PF the target is.

In the ending processing of the ECU_A 13 on the first PF, the first sequence control unit 141 provides a request for performing ending processing of the ECU_A 13 to the ECU_A 13 on the first PF via the communication I/F 162 and the first communication unit 163 (Steps S601 to S603). Then, a response is sent from the ECU_A 13 to the first sequence control unit 141 at the time of completion of the ending processing (Steps S604 to S606).

On the other hand, in the ending processing of the ECU_C 17 simulated on the first PF, the first sequence control unit 141 provides a request for performing ending processing to the pseudo update execution unit 151 that is the pseudo update management unit of the ECU_C 17 on the first PF via the communication I/F 162 (Steps S607 and S608). Then, the pseudo update execution unit 151 that has received the ending processing request acquires the ECU identification information, the PF information, and the post-conversion I/F (see FIG. 15) on the basis of the received request, ends the pseudo update management unit of the ECU_C 17 simulated on the first PF, and then transmits a response to the ending processing request to the first sequence control unit 141 via the communication I/F 162 (Steps S609 and S610).

Also, the processing for ending the ECU_D 19 simulated on the first PF is similar to the aforementioned processing for ending the ECU_C 17 (Steps S611 to S614).

As described above, the first sequence control unit 141 can execute the processing for ending each ECU in the system controlled on the first PF by performing the processing in Steps S601 to S614.

(1-3-6) Vehicle State Determination Processing Based on Execution Condition

Figure 19:
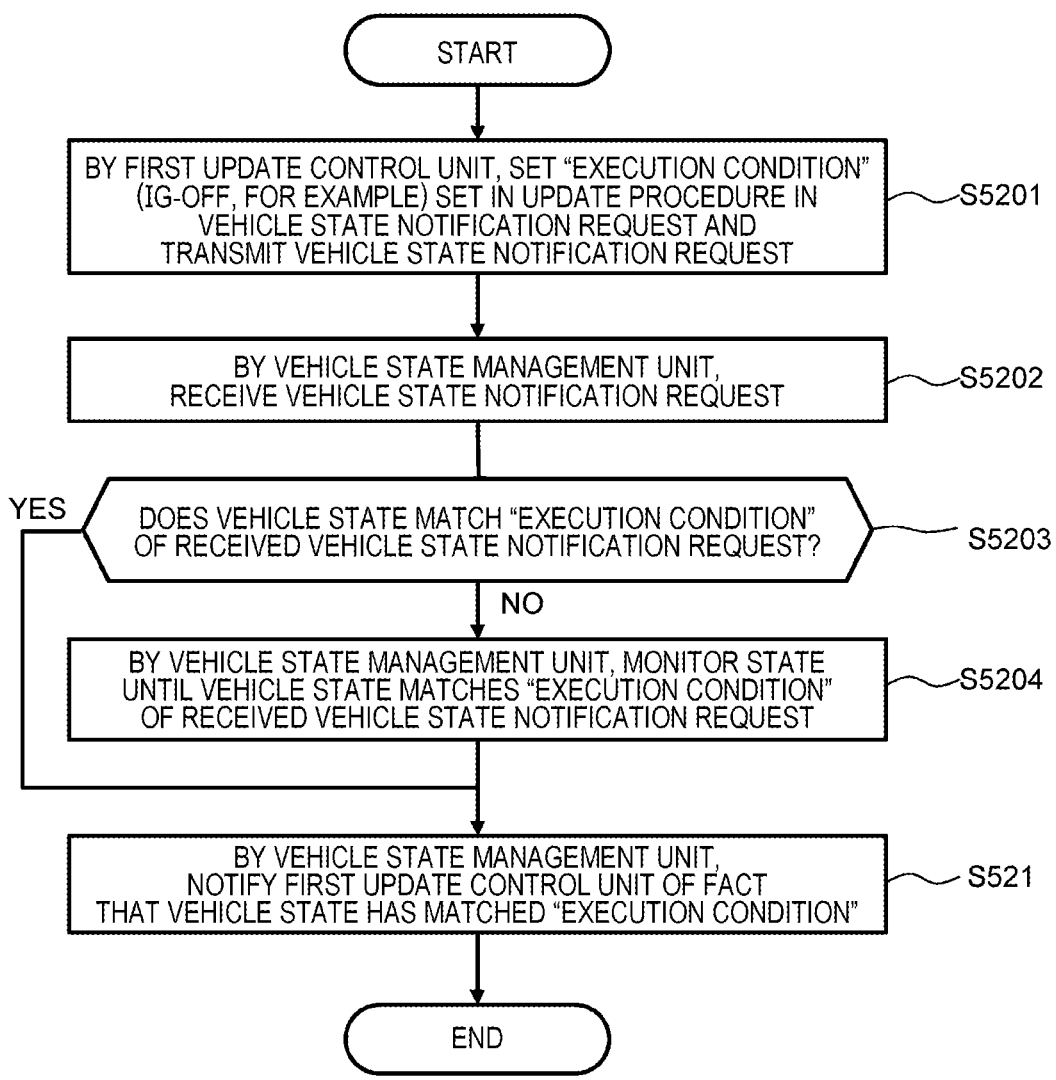
FIG. 19 is a flowchart illustrating a processing procedure example of vehicle state determination processing performed by a vehicle state management unit 130.

FIG. 19 is a flowchart illustrating a processing procedure example of vehicle state determination processing performed by the vehicle state management unit 130. The processing illustrated in FIG. 19 is processing for the first update control unit 140 (particularly, the first sequence control unit 141) to recognize a timing at which each process for the software update can be executed on the basis of the execution condition 256 in the vehicle overall update control information 251 included in the distribution package 250 and corresponds to detailed processing in Steps S520 and S521 in FIG. 17.

According to FIG. 19, the first sequence control unit 141 of the first update control unit 140 sets the execution condition 251 (specifically, turning-off of the ignition, for example) in the vehicle overall update control information 251 included in the distribution package 250 as a parameter of the vehicle state notification request and transmits it to the vehicle state management unit 130 first (Step S5201).

Next, once the vehicle state management unit 130 receives the vehicle state notification request (Step S5202), then the vehicle state management unit 130 checks whether or not the current vehicle state matches the execution condition included in the received vehicle state notification request (Step S5203). In a case where the execution condition is met (YES in Step S5203), the vehicle state management unit 130 notifies the first update control unit 140 (first sequence control unit 141) of the fact that the vehicle state matches the execution condition (Step S521).

On the other hand, in a case where the current vehicle state does not match the execution condition in Step S5203 (NO in Step S5203), the vehicle state management unit 130 monitors a state until the vehicle state matches the execution condition of the vehicle state notification request (Step S5204), and if matching is confirmed, then the vehicle state management unit 130 notifies the first update control unit 140 (first sequence control unit 141) of the fact that the vehicle state matches the execution condition (Step S521).

The software update device 10 can check the vehicle state and then execute the update process on the basis of the execution condition 256 by executing the above processing in Steps S5201 to S521, and it is thus possible to safely perform the software update. Also, it is possible to flexibly set a safety condition in accordance with the update content by including and transmitting the execution condition in the distribution package 250.

(1-3-7) Distribution Package Generation Processing

Figure 20:
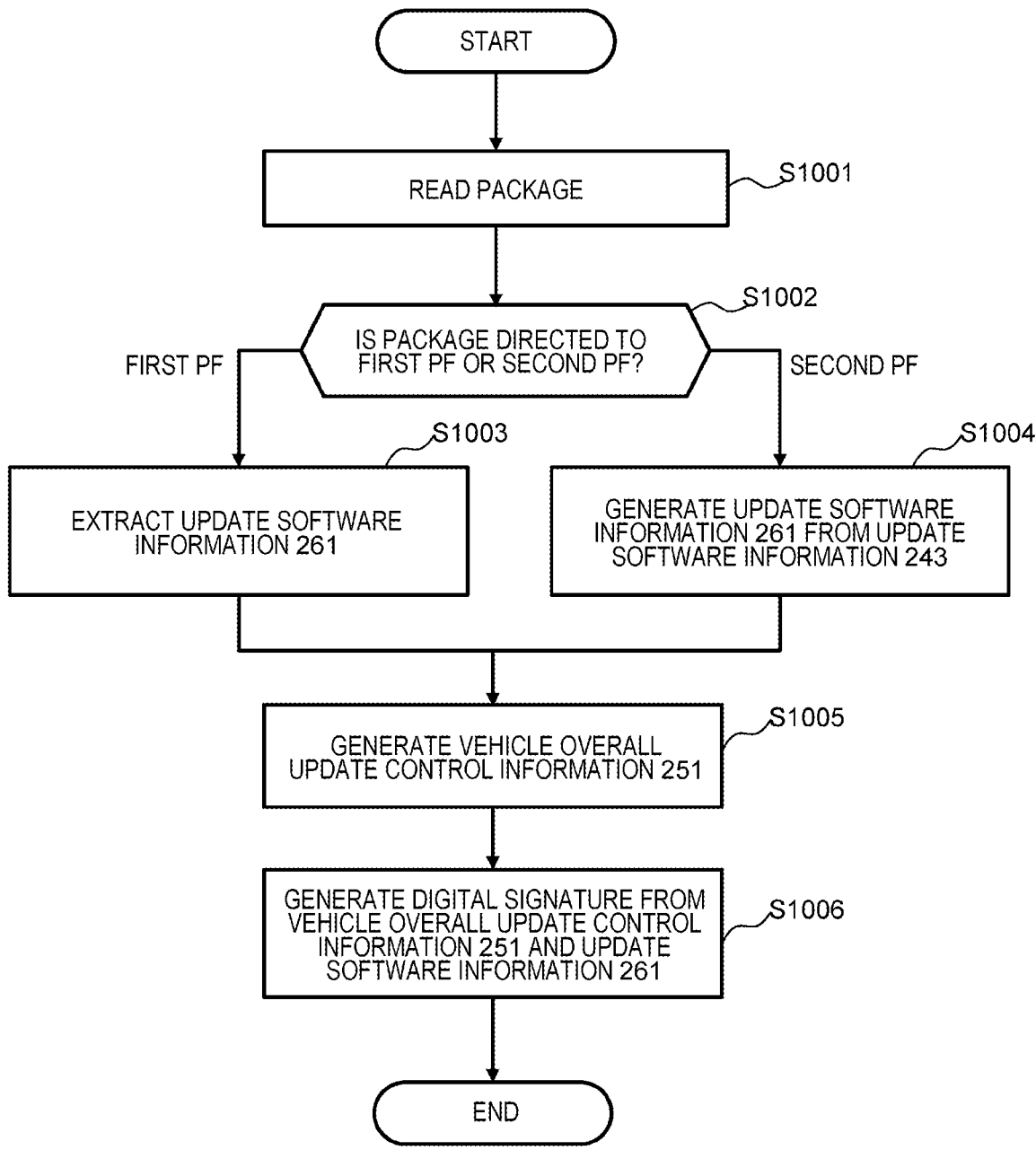
FIG. 20 is a flowchart illustrating a processing procedure example of distribution package generation processing.

FIG. 20 is a flowchart illustrating a processing procedure example of distribution package generation processing. The distribution package generation processing illustrated in FIG. 20 is processing in which the distribution package generation unit 31 of the distribution server 3 generates the distribution package 250.

According to FIG. 20, the distribution package generation unit 31 reads the software package from the software package management unit 42 of the software management system 4 first (Step S1001).

Next, the distribution package generation unit 31 determines which of the package directed to the first PF and the package directed to the second PF the software package read in Step S1001 is (Step S1002). In a case where the software package is determined to be directed to the first PF (the first PF in Step S1002), the distribution package generation unit 31 extracts update target software information 261 from the software package 230 (see FIG. 10) (Step S1003). On the other hand, in a case where the software package is determined to be directed to the second PF (the second PF in Step S1002), the distribution package generation unit 31 generates the update target software information 261 directed to the software package 240 from the update target software information 243 of the software package 240 (see FIG. 11(A)) (Step S1004).

Then, the distribution package generation unit 31 repeats the processing in Steps S1001 to S1004, extracts or generates the update target software information 261 for all the read software packages, and then generates the vehicle overall update control information 251 (Step S1005).

Finally, the distribution package generation unit 31 generates a digital signature 271 from the vehicle overall update control information 251 and the update target software information 261 generated in Steps S1003 to S1005 (Step S1006).

In a case where the software package read from the software package management unit 42 is a package for the second PF, the distribution package generation unit 31 can generate the distribution package 250 that can be processed even on the first PF by generating the update target software information 261 added to the package for the first PF, through the processing in Steps S1001 to S1006 as described above.

As described above in detail with reference to each drawing, the software update device 10 according to the present embodiment can manage and control the software unit (ECU) on each platform and software in the ECU on the first platform even in a case where the vehicle system is configured of a plurality of types of platforms. Specifically, the second update control unit 150 holds the correspondence (pseudo ECU correspondence management table) of identification information with the first platform and the correspondence (interface conversion table) of the interfaces, the pseudo update execution unit 151 performs conversion between the platforms, and the control unit (first update control unit 140) of the first platform can integrally control the control command and the software processing on each ECU on the first platform by regarding an ECU on a platform other than the first platform as a pseudo ECU on the first platform.

In addition, the software update device 10 according to the present embodiment can receive the software package provided from the distribution server 3 outside the vehicle 2 at the control unit (first update control unit 140) of the first platform without depending on the platform where the target ECU is present, and can provide an instruction for a request for installation, activation, and the like for the target ECU on the first platform. Additionally, it is also possible to integrally provide an instruction for processing such as update of software of each ECU on the first platform. In other words, the software update device 10 according to the present embodiment can flexibly update the software of the vehicle system configured of the plurality of platforms.

In addition, since the software update device 10 according to the present embodiment uses the management information indicating the correspondence between the platforms to enable ECUs on the plurality of platforms to be handled on one platform as described above, it is possible to address a case where the platform configuration in the vehicle system changes or a case where addition or the like of ECUs is performed merely by changing the above management information without performing any large-scaled design change, which enables expansion with a scalable mechanism.

(2) Second Embodiment

The first embodiment has illustrated that it is possible to realize software update of a plurality of PFs by simulating the first PF by using a control function of the second PF for the update control function of the first PF. On the other hand, the second embodiment will illustrate that it is possible to realize software update of a plurality of PFs by the update function of the second PF controlling the update control function of the first PF. Note that description of configurations and processing similar to those in the first embodiment will be omitted in the description of the second embodiment.

(2-1) Software Configuration of Gateway

Figure 21:
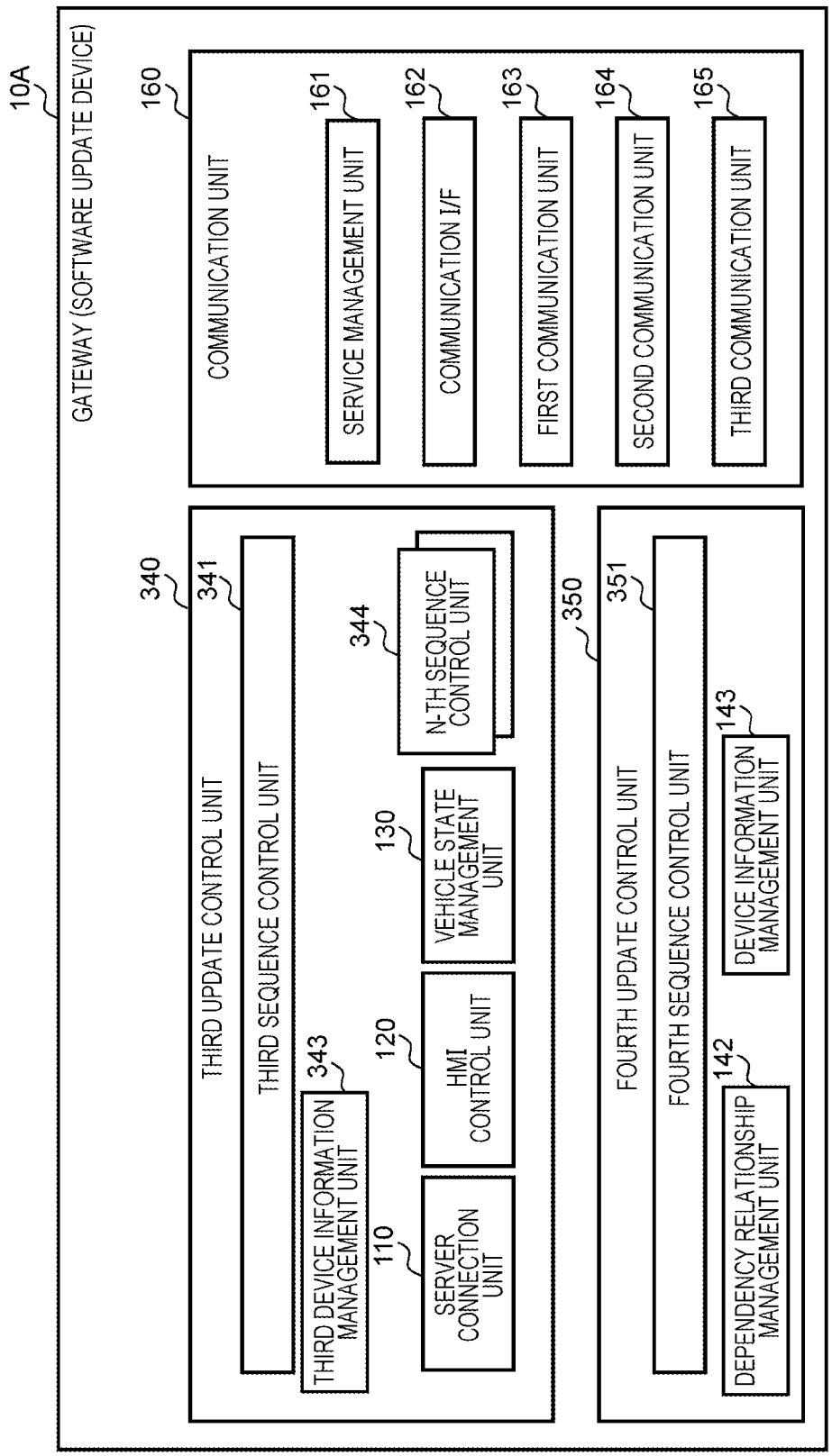
FIG. 21 is a block diagram illustrating a functional configuration example of a software update device (gateway) 10A according to a second embodiment of the present invention.

FIG. 21 is a block diagram illustrating a functional configuration example of a software update device (gateway) 10A according to the second embodiment of the present invention. In the second embodiment, the gateway 10A is used instead of the gateway 10 in the first embodiment. Note that description of the components denoted with the same numbers as those in FIG. 6 will be omitted in FIG. 21.

As illustrated in FIG. 21, the gateway (software update device) 10A is configured to include a third update control unit 340, a fourth update control unit 350, and a communication unit 160.

The third update control unit 340 performs software update control of the ECUs on the assumption of the second PF. The third update control unit 340 is configured of a third sequence control unit 341, a third device information management unit 343, a server connection unit 110, an HMI control unit 120, a vehicle state management unit 130, and an N-th sequence control unit 344. The N-th sequence control unit 344 controls a sequence for software update on a platform for each platform similarly to the N-th sequence control unit 154, the second sequence control unit of which has been exemplified in FIG. 6. In other words, the N-th sequence control unit 344 in the present embodiment includes a control unit that controls the update sequence of a first PF.

The third sequence control unit 341 controls the entire sequence of the software update. The third sequence control unit 341 performs overall control of the ECUs on the second PF present in a system of a vehicle 2 and software update of the first PF, via the N-th sequence control unit 344. The third sequence control unit 341 provides a control instruction to the fourth update control unit 350 in accordance with an interface specification defined in the first PF and controls the software update when the software on the first PF is updated. The third device information management unit 343 collects software information in the vehicle 2 and manages the configuration information of the vehicle 2, similarly to the device information management unit 143 illustrated in FIG. 6.

The fourth update control unit 350 performs software update control of the first PF in response to an instruction from the third update control unit 340. The fourth update control unit 350 is configured of a fourth sequence control unit 351, a dependency relationship management unit 142, and a device information management unit 143. The fourth sequence control unit 351 controls a sequence of the software update in the first PF.

As described above, it is possible to perform the software update of the first PF by adding the N-th sequence control unit 344 for the first PF to the update control function of the second PF in the second embodiment by configuring the gateway 10A as described above.

(2-2) Processing

Hereinafter, various operations or processing executed by the software update system according to the second embodiment will be described in detail by focusing on parts that are different from those in the first embodiment.

(2-2-1) Operation at Time of Activation

Figure 22:
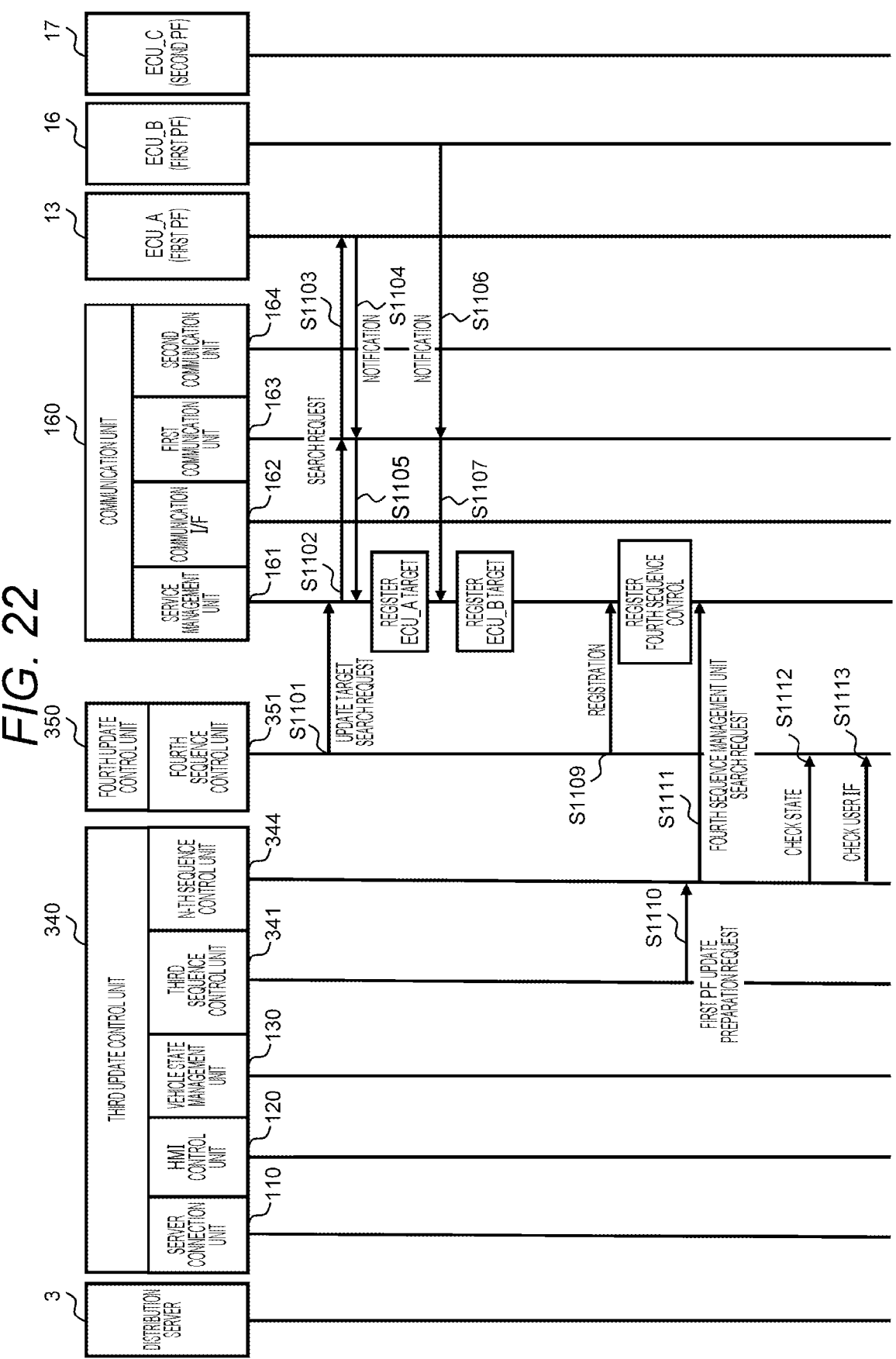
FIG. 22 is a sequence diagram illustrating a procedure example of an operation at the time of system activation in a vehicle 2 according to the second embodiment.

FIG. 22 is a sequence diagram illustrating a procedure example of an operation at the time of system activation in the vehicle 2 according to the second embodiment. The system in the vehicle 2 is triggered and activated by turning-on of a power source or the like of the vehicle 2, for example, and at this time, the gateway (software update device) 10A starts the operation at the time of activation illustrated in FIG. 22.

According to FIG. 22, the fourth sequence control unit 351 of the fourth update control unit 350 transmits an update target search request for requesting search for a service that is present in the system of the vehicle 2 to the service management unit 161 of the communication unit 160 first (Step S1101).

Then, the service management unit 161 that has received the update target search request in Step S1101 issues a search request in the system via the first communication unit 163 and receives a notification of a search result (Steps S1102 to S1105). More specifically, software of each ECU issues a service notification indicating presence of a service of the software itself in response to the search request received from the first communication unit 163. Since operations for the search request and service registration in Steps S1102 to S1107 in FIG. 22 are similar to Steps S102 to S107 in FIG. 13, description thereof will be omitted.

Next, the fourth sequence control unit 351 registers the fourth sequence control unit 351 itself as a service in the service management unit 161 (Step S1109; fourth sequence control registration).

Also, the third sequence control unit 341 provides a first PF update preparation request to the N-th sequence control unit 344 in parallel with the above processing (Step S1110). Once the request is received, the N-th sequence control unit 344 issues the fourth sequence control unit search request for the service management unit 161, acquires access information (Step S1111), and provides a request for checking a vehicle state (Step S1112) and checking a user IF (Step S1113) to the fourth sequence control unit 351 on the basis of the information. The N-th sequence control unit 344 notifies the fourth sequence control unit 351 of a destination of the issued vehicle state request notification in a case where it is necessary to check the vehicle state, or notifies the fourth sequence control unit 351 of a destination of the issued user checking request notification in a case where the user is required to perform checking, by issuing such requests. In this manner, the fourth sequence control unit 351 can issue the vehicle state request notification and the user checking request notification for appropriate notification destinations.

The gateway 10A can register the service that is present in the system at the time of the system activation of the vehicle 2 in the management information of the service management unit 161 by the operation at the time of activation illustrated in FIG. 22 being performed as described above, the N-th sequence control unit 344 can acquire access information of the fourth sequence control unit 351 and is allowed to have an access, and the fourth sequence control unit 351 can recognize destinations of the issued vehicle state request notification and the user checking request notification. Note that the first PF update preparation may be performed when it becomes unnecessary to perform any update rather than at the time of the activation.

(2-2-2) Collection of Configuration Information to Reception of Vehicle Package

Figure 23:
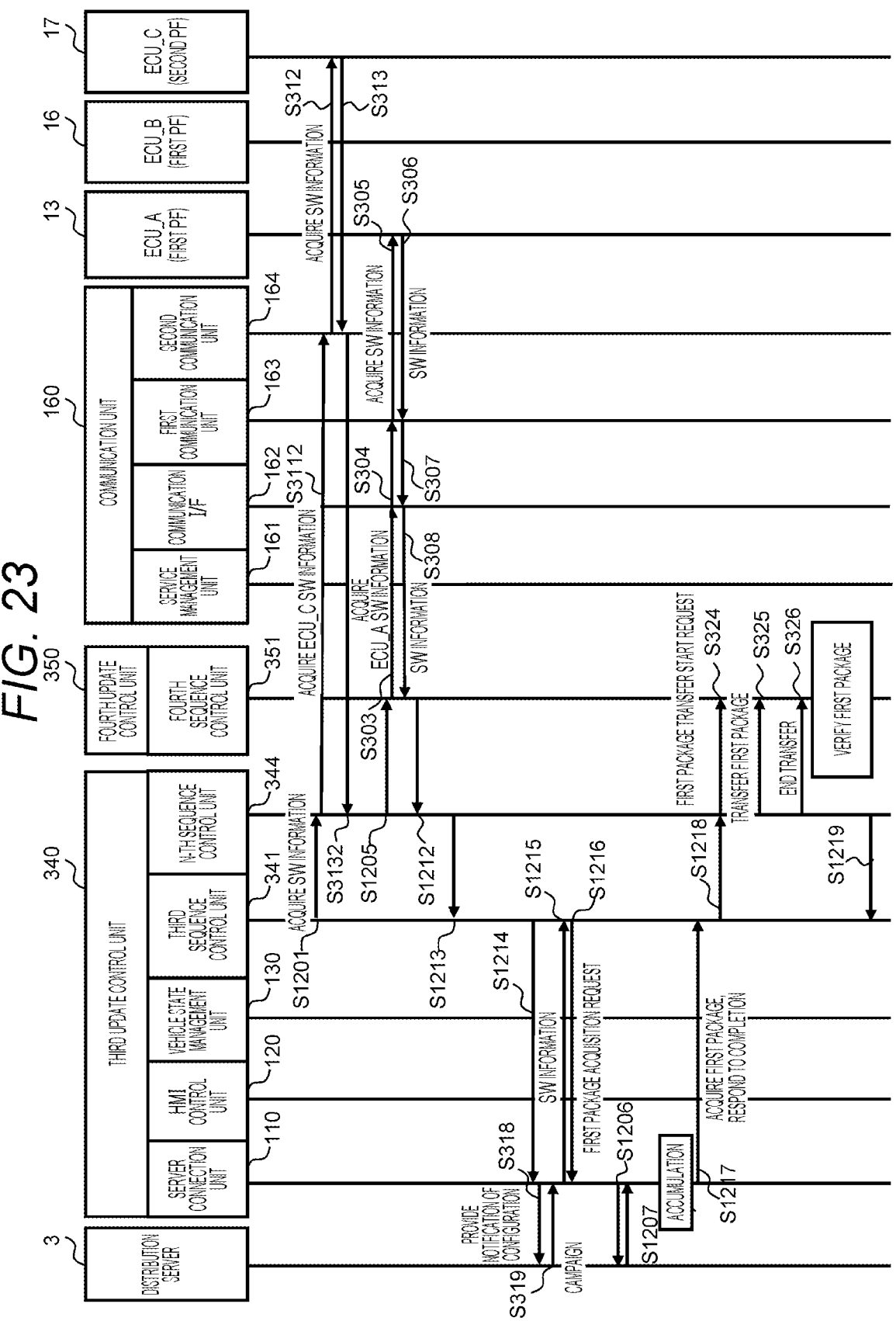
FIG. 23 is a sequence diagram illustrating a procedure example related to collection of configuration information to reception of a vehicle package according to the second embodiment.

FIG. 23 is a sequence diagram illustrating a procedure example related to collection of configuration information to reception of a vehicle package according to the second embodiment. More specifically, FIG. 23 illustrates a procedure example of processing in which the third sequence control unit 341 collects software information in the system, the server connection unit 110 transmits the software information as the configuration information to the distribution server 3 to have synchronization therebetween, and the third sequence control unit 341 determines a list of vehicle packages (a distribution package and a software package) to be downloaded on the basis of campaign information provided from the distribution server 3 and receives each vehicle package.

According to FIG. 23, the third sequence control unit 341 provides a request for acquiring SW information to the N-th sequence control unit 344 (Step S1201). Once the N-th sequence control unit 344 receives the request, the N-th sequence control unit 344 acquires the SW information of the ECU_C 17 via the second communication unit 164 (Steps S3112 to S3132). Next, the N-th sequence control unit 344 provides a request for acquiring SW information of the second PF to the fourth sequence control unit 351 (Step S1205). Once the request is received, the fourth sequence control unit 351 acquires the SW information of the ECU_A 13 (Steps S303 to S308). In FIG. 23, illustration of the acquisition of the SW information of the ECU_B 16 is omitted. Once the collection of the SW information of the ECU on the first PF is completed, then the fourth sequence control unit 351 transmits the collected SW information to the N-th sequence control unit 344 (Step S1212).

Then, once the collection of the SW information of the vehicle 2 via the N-th sequence control unit 344 is completed (Step S1213), the third sequence control unit 341 provides, to the server connection unit 110, a request for providing a notification of the SW information to the server (Step S1214), and the server connection unit 110 notifies the distribution server 3 of the received software information as configuration information (Step S318).

Next, the distribution server 3 checks whether there is software that can be updated on the basis of the configuration information received in Step S318 and responds to the server connection unit 110 with the campaign information for performing update in a case where there is software that can be updated (downloaded from the side of the vehicle 2) (Step S319).

Next, the server connection unit 110 notifies the third sequence control unit 341 of a response result of the server and the campaign information (Step S1215). Although description of a detailed method for the third sequence control unit 341 to read the list of the update packages to be downloaded will be omitted, the third sequence control unit 341 may cause the HMI control unit 120 to display a list of the campaigns on the HMI, for example, and allow the user to select a vehicle package (update package) that the user desires to download, for example. Then, the third sequence control unit 341 notifies the server connection unit 110 of the first package acquisition request (Step S1216).

Next, the server connection unit 110 provides a request for providing a first package to the distribution server 3 (Step S1206). The server connection unit 110 that has received the update package from the distribution server 3 (Step S1207) temporarily accumulates the received package and notifies the third sequence control unit 341 of the fact that the acquisition has been completed (Step S1217).

Then, the third sequence control unit 341 provides a request for starting transfer of the update package (first package) to the fourth sequence control unit 351 via the N-th sequence control unit 344 (Step S1218), and the N-th sequence control unit 344 transfers the first package to the fourth sequence control unit 351 (Steps S324 and S325). Then, once the transfer of the first package ends, the N-th sequence control unit 344 notifies the third sequence control unit 341 of the completion of the transfer of the first package (Step S1219).

The third sequence control unit 341 can acquire information (campaign information) related to the software that can be updated in the system and download the arbitrary vehicle package (update package) selected from the campaigns from the distribution server 3 by the above processing in Steps S1201 to S1219.

(2-2-3) Installation

Figure 24:
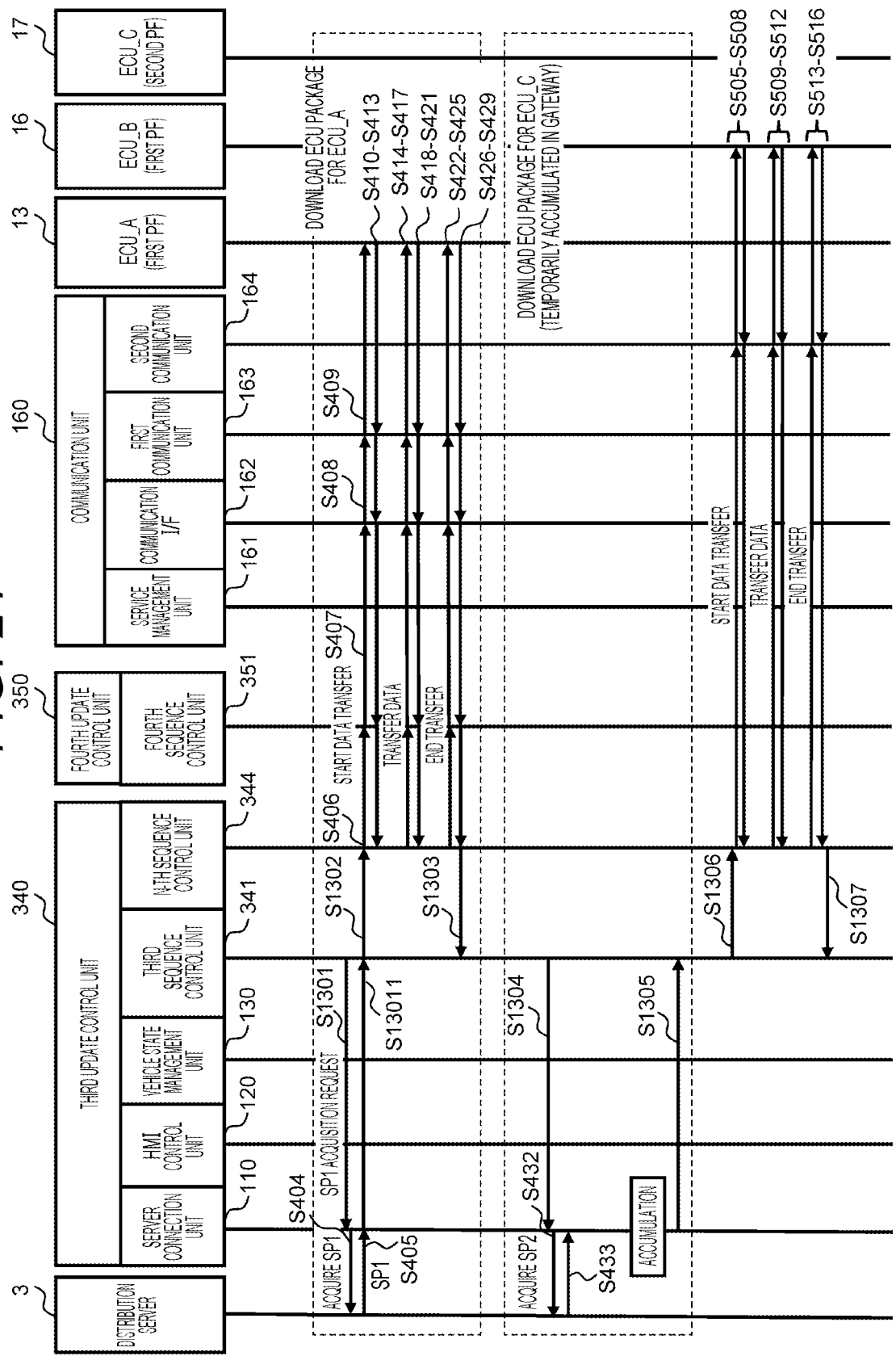
FIG. 24 is a sequence diagram illustrating a procedure example for installation of a software package for updating an ECU according to the second embodiment.

FIG. 24 is a sequence diagram illustrating an example of a procedure for installing a software package for updating an ECU according to the second embodiment. On the assumption of the processing illustrated in FIG. 24, it is assumed that the campaign information acquired by the fourth sequence control unit 351 from the distribution server 3 through the processing illustrated in FIG. 23 includes information for updating the software of the second PF and the downloaded update package includes information for updating the software of the first PF. Also, FIG. 24 illustrates a procedure example of processing for downloading the software packages (SP1 to SP3) for updating each ECU from the distribution server 3 and installing (data transfer) them in each ECU. Note that although not illustrated in detail, the timing at which the data is transferred to the ECU may be after the permission to execute activation is obtained, similarly to the first embodiment. Also, the checking of the vehicle state for checking whether or not the installation is possible is omitted in the drawing.

In FIG. 24, the third sequence control unit 341 determines whether or not to start the installation processing on the basis of the vehicle state acquired by the vehicle state management unit 130 (not illustrated), and in a case where it is determined that the installation processing may be started, the third sequence control unit 341 starts downloading of the software package (SP) for updating the ECU, which will be described below.

Note that the processing procedure for downloading the software package for updating the ECU differs depending on whether the target ECU is an ECU on the first PF. In other words, processing procedures are different for the case of downloading the ECU package (SP1) for the ECU_A 13 and for the case of downloading the ECU package (SP2) for the ECU_C 17 or the ECU package (SP2) for the ECU_D 19 in FIG. 24.

In the processing of downloading the ECU package (SP1) for the ECU_A 13, the third sequence control unit 341 provides a request for acquiring the SP1 to the server connection unit 110 first (Step S1301). The server connection unit 110 that has received the request receives the SP1 from the distribution server 3 by providing a request for acquiring the SP1 to the distribution server 3 (Steps S404 and S405).

Next, the server connection unit 110 provides a response for a start of data transfer of the SP1 (Step S13011). Once the response for the start of data transfer is received, the third sequence control unit 341 provides a request for starting the data transfer to the fourth sequence control unit 351 via the N-th sequence control unit 344 (Step S1302). Specifically, the N-th sequence control unit 344 notifies the fourth sequence control unit 351 of the start of the transfer of the SP1, and the fourth sequence control unit 351 notifies the update management unit of the ECU_A 13 on the first PF of the start of the transfer via the communication I/F 162 and the first communication unit 163 (Steps S406 to S409). Then, a response to the notification of the transfer start is transmitted from the ECU_A 13 to the server connection unit 110 via the first communication unit 163, the communication I/F 162, and the first sequence control unit 141 (Steps S410 to S413).

Next, the N-th sequence control unit 344 transfers the data of the SP1 to the ECU_A 13. Specifically, the N-th sequence control unit 344 transmits the SP1 to the fourth sequence control unit 351, and the fourth sequence control unit 351 transfers the SP1 to the update management unit of the ECU_A 13 on the first PF via the communication I/F 162 and the first communication unit 163 (Steps S414 to S417). Then, a response to the data transfer is transmitted from the ECU_A 13 to the server connection unit 110 via the first communication unit 163, the communication I/F 162, and the fourth sequence control unit 351 (Steps S418 to S421).

Then, once the data transfer of the SP1 ends, the N-th sequence control unit 344 provides a notification of the end of the data transfer of the SP1. The notification is transferred to the update management unit of the ECU_A 13 via the fourth sequence control unit 351, the communication I/F 162, and the first communication unit 163 (Steps S422 to S425) similarly to the case of the notification of the start of the data transfer, and the response thereto is transmitted to the server connection unit 110 (Steps S426 to S429).

As described above, the gateway 10A can transmit the software package (the SP1 in this case) from the distribution server 3 directly to the ECU_A via the third sequence control unit 341 and the N-th sequence control unit 344, and the update management unit of the ECU_A 13 can install the received SP1.

On the other hand, the downloaded software package is not immediately transferred to the target ECU but is temporarily accumulated inside the gateway 10A (third sequence control unit 341) in downloading of the ECU package for the ECU on the second PF. As an example of such a processing procedure, a processing procedure for downloading the ECU package (SP2) for the ECU_C 17 will be described below.

In the processing for downloading the ECU package (SP2) for the ECU_C 17, the third sequence control unit 341 provides a request for acquiring the SP2 to the server connection unit 110 first (Step S1304). The server connection unit 110 that hat received the request receives the SP1 from the distribution server 3 by providing a request for acquiring the SP1 to the distribution server 3 (Steps S432 to S433) and if accumulation of the SP2 is completed, then notifies the third sequence control unit 341 of the fact (Step S1305).

Next, the third sequence control unit 341 provides a notification of the start of the data transfer of the SP2. Specifically, the third sequence control unit 341 notifies the N-th sequence control unit 344 of the start of the transfer of the SP2, and the N-th sequence control unit 344 notifies the ECU_C 17 of the start of the transfer via the second communication unit 164 (Steps S505 to S508). Next, the N-th sequence control unit 344 transits the SP2 to the ECU_C 17 as processing of data transfer (Steps S509 to S512). Then, once the data transfer of the SP2 ends, the N-th sequence control unit 344 notifies the ECU_C 17 of the end of the data transfer of the SP2 (Steps S513 to S516).

As described above, the gateway 10A can control the downloading and the installation of the software package from the distribution server 3 by the third sequence control unit 341 of the second PF.

(2-2-4) Activation

FIG. 25 is a sequence diagram illustrating a procedure example for activation of a software package for updating an ECU according to the second embodiment.

According to FIG. 25, the fourth sequence control unit 351 transmits a request for notifying a vehicle state to the vehicle state management unit 130 via the N-th sequence control unit 344 and the third sequence control unit 341 to ask the vehicle state management unit 130 to provide a notification when a state where activation is possible is achieved in order to recognize the timing at which the activation of the installed update package is checked first (Steps S1401 to S1403).

As a trigger for checking the activation, the vehicle state management unit 130 provides a notification of the fact that the vehicle state has been brought into a state where activation is possible to the fourth sequence control unit 351 via the third sequence control unit 341 and the N-th sequence control unit 344 when the ignition is turned OFF (IG-OFF), for example (Steps S1404 to S1406).

The fourth sequence control unit 351 that has received the notification provides a request for displaying a checking screen for asking the driver whether or not it is possible to execute activation to the HMI control unit 120 via the N-th sequence control unit 344 and the third sequence control unit 341 (Step S1407 to S1410). Once permission to execute the activation is obtained from the driver on the checking screen, the HMI control unit 120 notifies the third sequence control unit 341 of the checking result (Step S1411). Once the result is received, the third sequence control unit 341 provides a request for executing the activation to the N-th sequence control unit 344 (Step S1413). Although a display mode on the checking screen is not particularly limited, a list of software packages waiting for activation may be displayed such that the driver can select a permission target, or the driver can collectively permit the activation, for example. Also, there may be update software that does not require driver's permission for activation depending on the type of the update software.

Once the activation request is received, the N-th sequence control unit 344 provides a request for the user checking result notification and the start of activation to the fourth sequence control unit 351 first, and the fourth sequence control unit 351 provides a request for activation to the ECU_A 13 via the communication IF 162 (Steps S543 to S548). Next, the N-th sequence control unit 344 provides a request for activation to the ECU_C 17 via the second communication unit 164 (Steps S552 to S557).

Then, once the activation of the update target ECU is completed in each ECU, the N-th sequence control unit 344 notifies the third sequence control unit 341 of the result (Step S1414).

Thereafter, the third sequence control unit 341 provides a request for ending processing to the N-th sequence control unit 344 (Step S1415), and the N-th sequence control unit 344 provides a request for the ending processing to the ECU_A 13 via the communication IF 162 (Steps S602 to S605). Then, once the ending processing of the update target ECU is completed, the N-th sequence control unit 344 notifies the third sequence control unit 341 of the result (Step S1416), and activation processing ends.

As described above, the gateway 10A can control the activation of the software package that has already been installed on the ECU as an update target by the third sequence control unit 341 of the second PF.

As described above, according to the software update device 10A in the second embodiment, the update function of the second PF can control the update control function of the first PF and realize the software update of the plurality of PFs. Therefore, it is possible to manage and control, on the second platform, the software units (ECUs) on each platform and the software in the ECUs even in a case where the vehicle system is configured of a plurality of types of platforms. In other words, the software update device 10A according to the second embodiment can flexibly update the software of the vehicle system configured of the plurality of platforms similarly to the software update device 10 according to the first embodiment.

Note that the present invention is not limited to the aforementioned embodiments, and various modifications are included therein. For example, the aforementioned embodiments have been described in detail for explaining the present invention to be easily understood and are not necessarily limited to embodiments including all the described configurations. Also, addition of other configurations, deletion, and replacement can be made for some of the configurations in the embodiments.

Also, each of the above configurations, functions, processing units, processing means, and the like may be partially or entirely realized by hardware by being designed as an integrated circuit, for example. In addition, each of the above configurations, functions, and the like may be realized by software by a processor interpreting and executing a program realizing each function. Information such as a program, a table, a file, and the like for realizing each function can be placed in a recording device such as a memory, a hard disk, or a Solid State Drive (SSD) or a recording medium such as an IC card, an SD card, or a DVD.

In addition, the control lines and the information lines that are considered to be necessary for explanation are illustrated in the drawings, and the drawings do not necessarily illustrate all the control lines and information lines of a product. Almost all the configurations may be considered to be connected to each other in practice.

REFERENCE SIGNS LIST 1 software update system
2 vehicle
3 distribution server
4 (4A, 4B, 4X) software management system
5 network
6 diagnosis device
10, 10A gateway (software update device)
11 in-vehicle network
12 communication module
13 drive assistance integrated ECU (ECU_A)
14 camera ECU
15 sensor ECU
16 chassis integrated ECU (ECU_B)
17 engine control ECU (ECU_C)
18 transmission control ECU
19 airbag ECU (ECU_D)
20 HVACECU
21 vehicle body management ECU
22 IVI(ECU_E)
31 distribution package generation unit
32 distribution package management unit
33 distribution unit
41 software package generation unit
42 software package management unit
50 switch
51, 61 SoC
52, 62, 81, 91 microcomputer
53, 63 nonvolatile memory
54, 58, 68, 84, 94 ROM
55, 56, 65, 66, 82, 92 CPU
57, 64, 67, 83, 93 RAM
59, 69, 85, 95 communication control unit
70, 86 first bank
71, 87 second bank
110 server connection unit
120 HMI control unit
130 vehicle state management unit
140 first update control unit
141 first sequence control unit
142 dependency relationship management unit
143 device information management unit
150 second update control unit
151 pseudo update execution unit
152 dependency relationship management unit
153 conversion information management unit
154 N-th sequence control unit (second sequence control unit)
155 pseudo ECU management unit
156 interface management unit
160 communication unit
161 service management unit
162 communication I/F
163 first communication unit
164 second communication unit
165 third communication unit
170 FuncA
171 first APP
172 second PF_MW
173 RTOS
180 FuncB
181 third APP
182 fourth APP
183 first PF_MW
184 POSIX_OS184
185, 186 first PF_SW
190 hypervisor
210 pseudo ECU correspondence management table
220 interface conversion table
230, 240 software package 250 distribution package
340 third update control unit
341 third sequence control unit
343 third device information management unit
344 N-th sequence control unit
350 fourth update control unit
351 fourth sequence control unit

The invention claimed is:

1. A software update device that is connected to a plurality of software units including a first software unit configured of a first platform and a second software unit configured of a second platform that is different from the first platform, the software update device comprising:
   a first update control unit that performs software update for the first software unit; and
   a second update control unit that performs software update for the second software unit,
wherein
   the first update control unit includes a first sequence control unit that transmits a control command directed to the first platform, and
   the second update control unit includes a pseudo update execution unit that simulates the second software unit as a software unit on the first platform and controls the software update for the second software unit based on reception of the control command for the second software unit simulated on the first platform; and
   wherein the second update control unit further includes a conversion information management unit that manages conversion information that is referred to at a time of conversion of the control command, and
   once the control command directed to the first platform for the second software unit simulated on the first platform is received from the first sequence control unit, the pseudo update execution unit converts the control command into a control command directed to the second platform based on the conversion information and transmits the control command after the conversion to the second software unit.

2. The software update device according to claim 1, wherein the conversion information management unit holds, as one piece of the conversion information, first conversion information indicating a correspondence between identification information at a time of the simulation on the first platform and identification information on the second platform for each second software unit configured of the second platform.

3. The software update device according to claim 1, wherein the conversion information management unit holds, as one piece of the conversion information, second conversion information indicating a correspondence between the control command directed to the first platform and the control command directed to the second platform.

4. The software update device according to claim 3, wherein
   a dependency condition that the second software unit depends on in the second platform in regard to whether or not software is rewritable is set in the second conversion information, and
   the pseudo update execution unit refers to the second conversion information when the software update for the second software unit is requested by the control command directed to the first platform from the first sequence control unit, and updates the software in a case where the dependency condition is satisfied, or does not update the software in a case where the dependency condition is not satisfied.

5. The software update device according to claim 1, wherein in a case where an update program for the second software unit is distributed from a distribution server connected via a network, the first sequence control unit transmits a control command for requesting data transfer for the update program to the second software unit simulated on the first platform, and the pseudo update execution unit that has received the control command temporarily accumulates the update program without transferring the update program to the second software unit until a predetermined condition is satisfied, based on the conversion information.

6. The software update device according to claim 5, wherein in a case where activation of the update program for the second software unit distributed from the distribution server is permitted, the first sequence control unit transmits a control command for requesting validation of the update program to the second software unit simulated on the first platform, and the pseudo update execution unit that has received the control command transmits a control command for providing an instruction for validating the update program to the second software unit after transfer of the update program to the second software unit ends.

7. A software update system in which comprising:
   a distribution server that distributes an update program;
   a vehicle system that receives the update program from the distribution server; and
   a network, to which the distribution server and the vehicle system are connected and through which the distribution server and the vehicle system communicate with each other,
wherein
   the vehicle system includes
   a plurality of software units that include a first software unit configured of a first platform and a second software unit configured of a second platform that is different from the first platform, and
   a software update device that is connected to the first software unit and the second software unit,
   the software update device includes
   a first update control unit that performs software update for the first software unit, and
   a second update control unit that performs software update for the second software unit,
   the first update control unit includes a first sequence control unit that transmits a control command directed to the first platform, and
   the second update control unit includes a pseudo update execution unit that simulates the second software unit as a software unit on the first platform and controls the software update for the second software unit based on reception of the control command for the second software unit simulated on the first platform; and
   wherein the second update control unit further includes a conversion information management unit that manages conversion information that is referred to at a time of conversion of the control command, and
   once the control command directed to the first platform for the second software unit simulated on the first platform is received from the first sequence control unit, the pseudo update execution unit converts the control command into a control command directed to the second platform based on the conversion information and transmits the control command after the conversion to the second software unit.

8. A software update method performed by a software update device that is connected to a plurality of software units that include a first software unit configured of a first platform and a second software unit configured of a second platform that is different from the first platform, the software update device including a first update control unit that transmits a control command directed to the first platform and performs software update for the first software unit, and a second update control unit that simulates the second software unit as a software unit on the first platform and performs software update for the second software unit, the method comprising:

a first step of transmitting the control command for the second software unit simulated on the first platform, by the first update control unit; and a second step of converting the control command into a control command for the second platform and controlling the software update for the second software unit in accordance with the control command after the conversion, by the second update control unit that has received the control command; and wherein the second update control unit further includes a conversion information management unit that manages conversion information that is referred to at a time of conversion of the control command, and once the control command directed to the first platform for the second software unit simulated on the first platform is received from the first sequence control unit, the pseudo update execution unit converts the control command into a control command directed to the second platform based on the conversion information and transmits the control command after the conversion to the second software unit.

* * * * *